(12) United States Patent
Jung et al.

(10) Patent No.: US 8,675,149 B2
(45) Date of Patent: Mar. 18, 2014

(54) BACKLIGHT UNIT AND DISPLAY APPARATUS COMPRISING THE SAME

(75) Inventors: Bupsung Jung, Seoul (KR); Sangtae Park, Seoul (KR); Soonhyung Kwon, Seoul (KR); Seungchoon Bae, Seoul (KR); Heewon Kwon, Seoul (KR); Hoon Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 13/085,139

(22) Filed: Apr. 12, 2011

(65) Prior Publication Data

US 2011/0249215 A1  Oct. 13, 2011

(30) Foreign Application Priority Data

Apr. 13, 2010  (KR) .................. 10-2010-0033825

(51) Int. Cl.
  *G02F 1/1335*  (2006.01)
  *G02F 1/13357*  (2006.01)
  *G09F 13/04*  (2006.01)

(52) U.S. Cl.
  USPC .............. 349/62; 349/61; 362/97.2; 362/97.3

(58) Field of Classification Search
  USPC .................. 349/61, 62, 64; 362/97.2, 97.3
  See application file for complete search history.

(56) References Cited

U.S. PATENT DOCUMENTS

| | | | |
|---|---|---|---|
| 2005/0122707 A1 | 6/2005 | Kim | |
| 2006/0077692 A1 | 4/2006 | Noh et al. | |
| 2006/0083019 A1 | 4/2006 | Hahm et al. | |
| 2007/0183136 A1* | 8/2007 | Park et al. | 362/97 |
| 2011/0228193 A1* | 9/2011 | Shin et al. | 349/61 |

FOREIGN PATENT DOCUMENTS

| | | |
|---|---|---|
| KR | 10-2005-0055387 A | 6/2005 |
| KR | 10-2005-0113419 A | 12/2005 |
| KR | 10-2006-0028577 A | 3/2006 |
| KR | 10-2006-0035044 A | 4/2006 |
| KR | 10-2006-0041140 A | 5/2006 |
| KR | 10-2006-0128551 A | 12/2006 |

* cited by examiner

*Primary Examiner* — Wen-Ying P Chen
(74) *Attorney, Agent, or Firm* — Birch, Stewart, Kolasch & Birch, LLP

(57) ABSTRACT

A backlight unit is provided that comprises a first layer, a plurality of light sources on the first layer, a reflection layer on the first layer, the reflection layer surrounding the plurality of light sources, a second layer on the reflection layer and the plurality of light sources, and a third layer on the second layer, the third layer comprising a plurality of light shielding patterns arranged to correspond to the light sources, respectively, and a light transmitting region surrounding the plurality of light shielding patterns, wherein the light transmitting region includes first regions adjacent to the light sources and second regions away from the light sources, and wherein the first regions are smaller in area than the second regions. A display apparatus comprising the backlight unit is provided as well.

18 Claims, 37 Drawing Sheets

(a)    (b)    (c)

light emitting direction ----> light emitting direction ----> light emitting direction ----▶ light emitting direction ----▶ light emitting direction ----▶

BACKLIGHT UNIT AND DISPLAY APPARATUS COMPRISING THE SAME

This application claims the priority benefit of Korean Patent Application No. 10-2010-0033825 filed on Apr. 13, 2010, which is incorporated herein by reference for all purposes as if fully set forth herein.

BACKGROUND

1. Field

This document is directed to a backlight unit and a display apparatus including the backlight unit.

2. Related Art

Due to the advantages of compact, lightweight, and low power consumption, liquid crystal display ("LCD") apparatuses have various applications, such as in laptop computers, personal computers, or monitors.

A LCD apparatus includes a LCD panel and a backlight unit. The backlight unit provides light to the LCD panel. The light transmits the LCD panel. The LCD panel controls transmittance of the light to display an image.

Backlight units may be classified into edge types and direct types. An edge-type backlight unit includes a light source at a side surface of the LCD panel and a light guide plate at a rear surface of the LCD panel. The light guide plate guides light from the light source to the LCD panel. A direct-type backlight unit includes a plurality of light sources at a rear surface of the LCD. The plurality of light sources directly supply light to the LCD panel.

EL (electro luminescence) lamps, CCFLs (cold cathode fluorescent lamps), HCFLs (hot cathode fluorescent lamps), LEDs (light emitting diodes) are used as light sources. LEDs have the advantages of low power consumption and high emission efficiency.

SUMMARY

Exemplary embodiments of this document provide a backlight unit having light shielding patterns to prevent hot spots from occurring at regions adjacent to light sources so that the backlight unit may provide light of uniform luminance, and a display apparatus including the backlight unit.

According to an embodiment of this document, there is provided a backlight unit comprising a first layer, a plurality of light sources on the first layer, a reflection layer on the first layer, the reflection layer surrounding the plurality of light sources, a second layer on the reflection layer and the plurality of light sources, and a third layer on the second layer, the third layer comprising a plurality of light shielding patterns arranged to correspond to the light sources, respectively, and a light transmitting region surrounding the plurality of light shielding patterns, wherein the light transmitting region includes first regions adjacent to the light sources and second regions away from the light sources, and wherein the first regions are smaller in area than the second regions.

According to an embodiment of this document, there is provided a display apparatus comprising a backlight unit and a display panel on the backlight unit, wherein the backlight unit includes a plurality of blocks that are driven separately from each other, and wherein the backlight unit comprises a first layer, a plurality of light sources on the first layer, a reflection layer on the first layer, the reflection layer surrounding the plurality of light sources, a second layer on the reflection layer and the plurality of light sources, and a third layer on the second layer, the third layer comprising a plurality of light shielding patterns arranged to correspond to the light sources, respectively, and a light transmitting region surrounding the plurality of light shielding patterns, wherein the light transmitting region includes first regions adjacent to the light sources and second regions away from the light sources, and wherein the first regions are smaller in area than the second regions.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Figure 1:
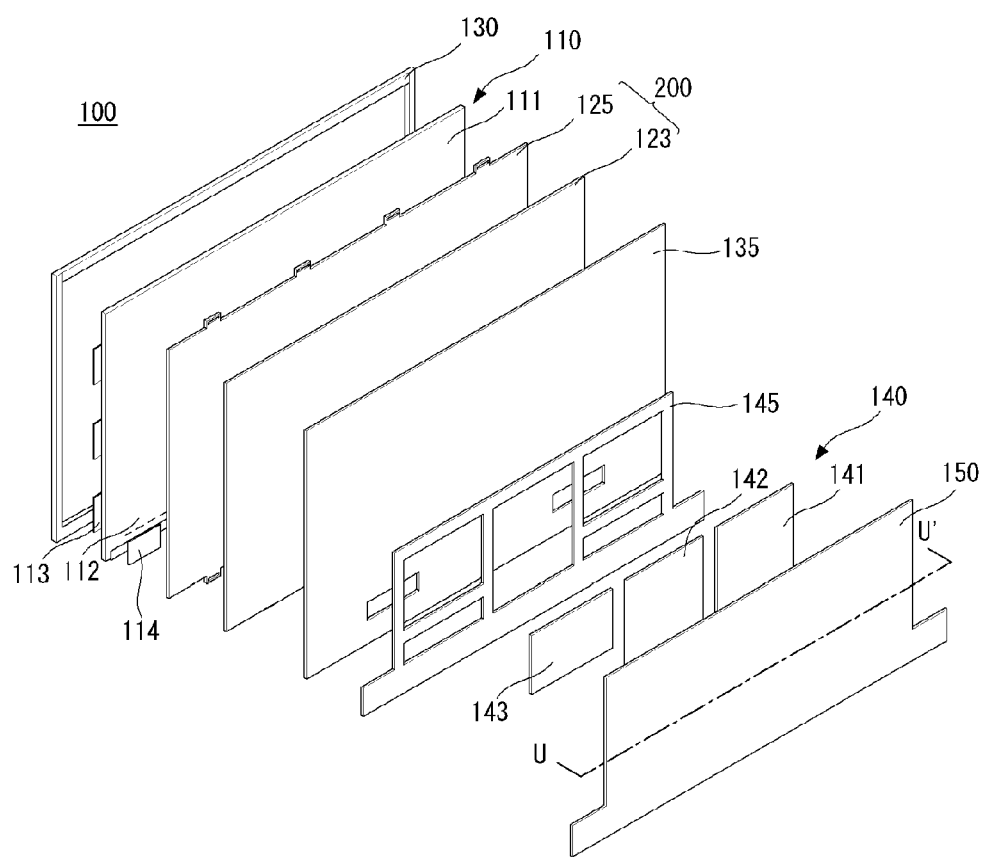
FIG. 1 is a view illustrating a display apparatus according to an embodiment of this document.

Hereinafter, exemplary embodiments of this document will be described with reference to the accompanying drawings, wherein the same reference numerals may be used to denote the same or substantially the same elements throughout the specification and the drawings.

FIG. 1 is a view illustrating a display apparatus according to an embodiment of this document.

Referring to FIG. 1, a display apparatus 100 according to an embodiment of this document includes a display panel 110, a backlight unit 200, a cover 130, a bottom plate 135, a driver 140, and a rear casing 150.

The display panel 110 displays an image. The display panel 110 includes a first substrate 111, a second substrate 112, and a liquid crystal layer between the first and second substrates 111 and 112. Although not shown in FIG. 1, the first substrate 111 also referred to as "TFT array substrate" includes a plurality of pixels that are formed at intersections of a plurality of scan lines and a plurality of data lines. Thin film transistors (TFTs) are arranged at the respective pixels and connected at respective pixel electrodes.

The second substrate 112 is also referred to as "color filter substrate". The second substrate 112 includes red (R), green (G), and blue (B) color filters respectively corresponding to the plurality of pixels, black matrixes surrounding the respective color filters and covering non-display elements, such as the scan and data lines and TFTs, and a transparent common electrode covering the color filters and the black matrixes.

A printed circuit board is connected to at least a side of the display panel 110 via a connecting member, such as a flexible circuit board or a tape carrier package (TCP). The printed circuit board is brought in tight contact with a rear surface of the bottom plate 135 during modularization.

In the thusly structured display panel 110, the TFTs turn on/off in response to ON/OFF signals from a gate driver 113 via the scan lines. When TFTs turn on, data voltages are applied from a data driver 114 to corresponding pixel electrodes via corresponding data lines, so that electric fields are generated between the corresponding pixel electrodes and the common electrode that change arrangement directions of liquid crystal molecules and as a result, causing a change in light transmittance.

The backlight unit 200 is arranged at a rear surface of the display panel 110 to provide light to the display panel 110.

The backlight unit 200 includes an optical assembly 123 and a plurality of optical sheets 125 on the optical assembly 123. The backlight unit 200 will be described below in detail.

The display panel 110 and the backlight unit 200 may be modularized with the cover 130 and the bottom plate 135. The cover 130 is positioned at a front surface of the display panel 110. According to an embodiment, the cover 130 may be a top cover that is shaped as a rectangular frame to cover top and side surfaces of the display panel 110. The cover 130 is open at its front surface so that an image may be viewed from the display panel 110 to outside.

The bottom plate 135 is positioned at a rear surface of the backlight unit 200. According to an embodiment, the bottom plate 135 may be a bottom cover that is shaped as a rectangular plate.

The driver 140 is positioned at a surface of the bottom plate 135. The driver 140 includes a driving controller 141, a main board 142, and a power supply 143. The driving controller 141 is a timing controller that adjusts operating timing of each driving circuit of the display panel 110. The main board 142 transmits V-sync and H-sync signals and R, G, and B resolution signals to the driving controller 141. The power supply 143 supplies power to the display panel 110 and the backlight unit 200.

The driver 140 is mounted on a driver chassis 145 and covered by the rear casing 150.

A backlight unit will now be described in more detail.

FIGS. 2 to 5 are views illustrating a backlight unit according to an embodiment of this document.

Figure 2:
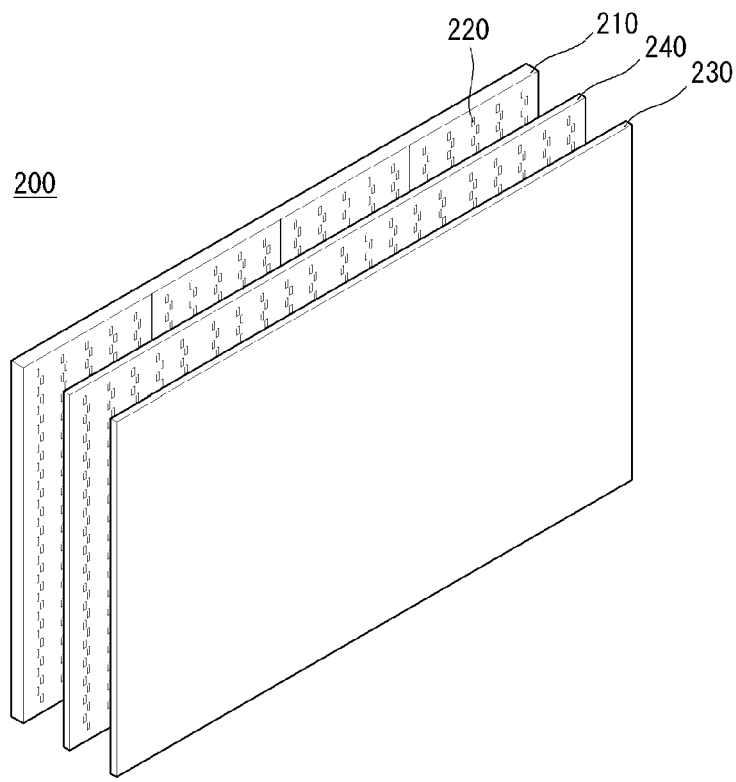
FIGS. 2 to 5 are views illustrating a backlight unit according to an embodiment of this document.
Figure 3:
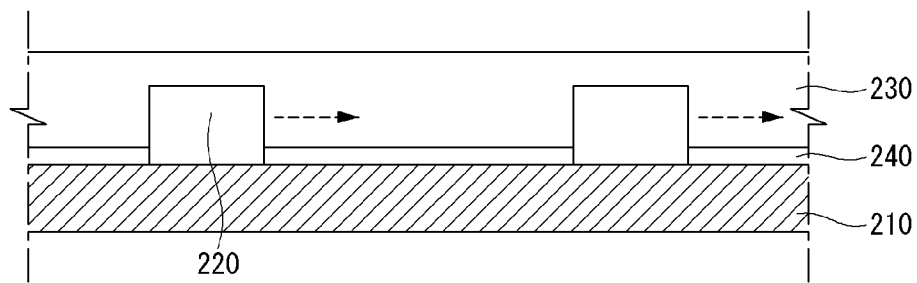

Referring to FIGS. 2 and 3, a backlight unit 200 according to an embodiment of this document includes a first layer 210, a plurality of light sources 220, a second layer 230, and a reflection layer 240.

The plurality of light sources 220 are formed on the first layer 210. The second layer 230 is arranged on the first layer 210 to cover the plurality of light sources 220.

The first layer 210 is a substrate on which the plurality of light sources 220 and electrode patterns (not shown) for connection to an adaptor (not shown) for supplying power are formed. For example, carbon nano tube (CNT) electrode patterns (not shown) may be formed on the substrate to connect the light sources 220 to the adaptor (not shown).

The first layer 210 is formed of polyethylene terephthalate (PET), glass, polycarbonate (PC), or silicon (Si). According to an embodiment, the first layer 210 may be a printed circuit board (PCB) or may be formed like a camera film.

According to an embodiment, each light source 220 may be an LED chip or an LED package having an LED chip. An example will be described where the light sources 220 are LED packages.

LED packages are classified into top view types and side view types depending on the direction in which light emission surfaces are oriented. Top view type LED packages have their light emission surfaces at upper surfaces and side view type LED packages have their light emission surfaces at side surfaces. According to an embodiment, the light sources 220 may employ at least a type of packages of top view type and side view type LED packages.

According to an embodiment, in the case that the light sources 220 are side view type LED packages, the light sources 220 have their light emission surfaces at side surfaces and thus emit light in a direction of extension of the first layer 210 or the reflection layer 240. As a consequence, the thickness of the second layer 230 may be decreased, resultantly making it possible to render the backlight unit 200 and the display apparatus thinner.

According to an embodiment, each light source 220 may be a colored LED that emits at least one of red, blue, and green light, or a white LED. The colored LED may include at least one of a red LED, a blue LED, and a green LED. According to an embodiment, the LEDs may be implemented to have various arrangements and amounts of light.

The second layer 230 is arranged on the first layer 210 to cover the plurality of light sources 220. The second layer 230 transmits and spreads light beams from the light sources 220 so that the light beams may be uniformly provided to the display panel 110.

The reflection layer 240 is arranged on the first layer 210 to reflect light from the light sources 220. Light reflection occurs at the first region. The reflection layer 240 does not only reflect light from the light sources but also reflects back light totally reflected by the second layer 230 so that light may be spread over a broader range.

According to an embodiment, the reflection layer 240 may include at least one of metals or metal oxides having high reflectivity, such as, for example, aluminum (Al), silver (Ag), gold (Ag), or TiO2.

According to an embodiment, the reflection layer 240 may be formed by depositing or coating a metal or a metal oxide on the first layer 210, or by printing a metal ink on the first layer 210. According to an embodiment, the deposition may include vacuum evaporation, such as thermal evaporation or sputtering, and the coating or printing may include a printing method, a gravure coating method, or a silkscreen method.

According to an embodiment, the second layer 230 may be formed of a light-transmissive material, such as, for example, a silicon-based or acrylic-based material. However, the embodiments of this document may not be limited thereto and various resins may be used to form the second layer 230.

According to an embodiment, the second layer 230 may be formed of a resin having a refractive index of about 1.4 to about 1.6 so that light from the light sources 220 may be diffused and the backlight unit 200 may have a uniform luminance. For example, the second layer 230 may be formed of any one selected from the group consisting of polyethylene terephthalate (PET), polycarbonate (PC), polypropylene (PP), polyethylene (PE), polystyrene (PS), polyepoxy (PE), silicon, and acrylic.

According to an embodiment, the second layer 230 may include an adhesive polymer resin allowing the second layer 230 to be firmly attached to the light sources 220 and the reflection layer 240. For example, the second layer 230 may be formed of an acrylic-based, urethane-based, epoxy-based, or melamine-based resin, such as, a polymer, a co-polymer, or a terpolymer of, for example, unsaturated polyester, methyl methacrylate, ethylmethacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylolacrylamide, glycidyl methacrylate, ethyl acrylate, isobutyl acrylate, normal butyl acrylate, and 2-ethyl hexyl acrylate.

According to an embodiment, the second layer 230 may be formed by applying a liquid or gel resin on the first layer 210 and by curing the resin, or may be formed by applying a resin on a support sheet and by partially curing the resin so that the resin-applied support sheet is attached to the first layer 210.

Figure 4:
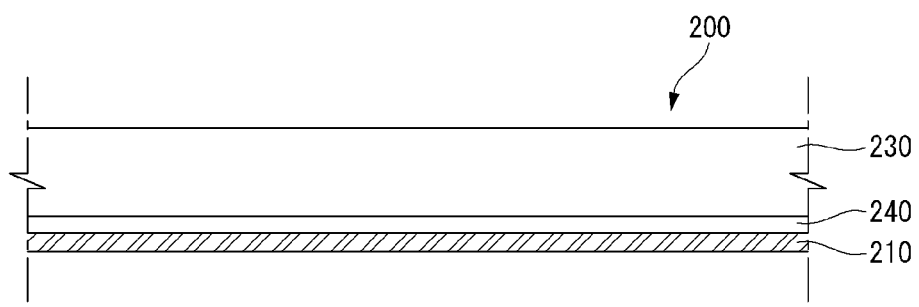

FIG. 4 is a cross section illustrating a region where no light sources 220 are positioned in the backlight unit 200.

Referring to FIG. 4, a region where no light sources 220 are arranged in the backlight unit 200 includes a structure in which the reflection layer 240 covers a top surface of the first layer 210.

The reflection layer 240 is formed on the first layer 210. The reflection layer 240 includes holes into which the light sources 220 may be inserted. The light sources 220 are projected upwards through the respective holes and are covered by the second layer 230.

Figure 5:
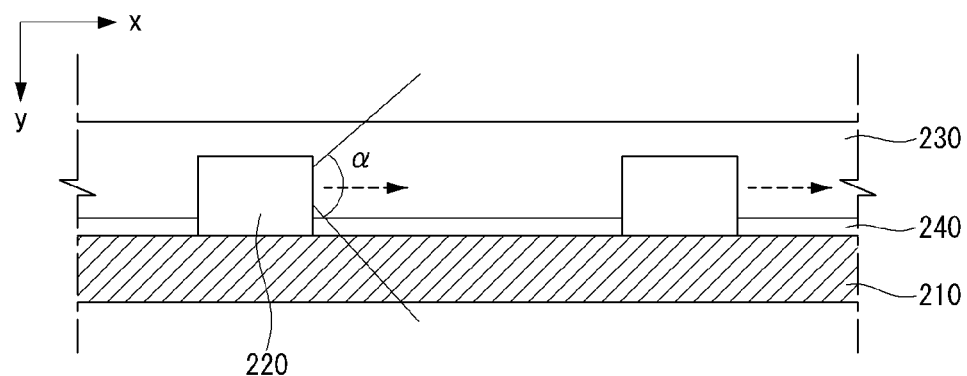

Referring to FIG. 5, the plurality of light sources 220 have their light emission surfaces at their side surfaces so that light may be radiated in a direction of the side surfaces, for example, in a direction of extension of the first layer 210 or the reflection layer 240.

For example, the plurality of light sources 220 may be implemented of side view type LED packages. This may reduce a phenomenon that the light sources 220 are viewed as hot spots on the screen as well as may contribute to a decrease in thickness of the second layer 230, thus leading to the backlight unit 200 and resultantly the display apparatus being thinner.

According to an embodiment, light emitted from the light sources 220 may have a predetermined orientation angle (α), for example, 90° C. to 150° C., with respect to a first direction (x). An example will now be described where a direction of light emitted from the light sources 220 is the first direction (x).

According to an embodiment, a pattern may be formed on a top surface of the second layer 230 so that light emitted from the light sources 220 through the top surface of the second layer 230 may be reflected and spread. Accordingly, light having a uniform luminance may be emanated from the backlight unit 200.

FIGS. 6 to 9 are views illustrating a backlight unit according to an embodiment of this document.

Figure 6:
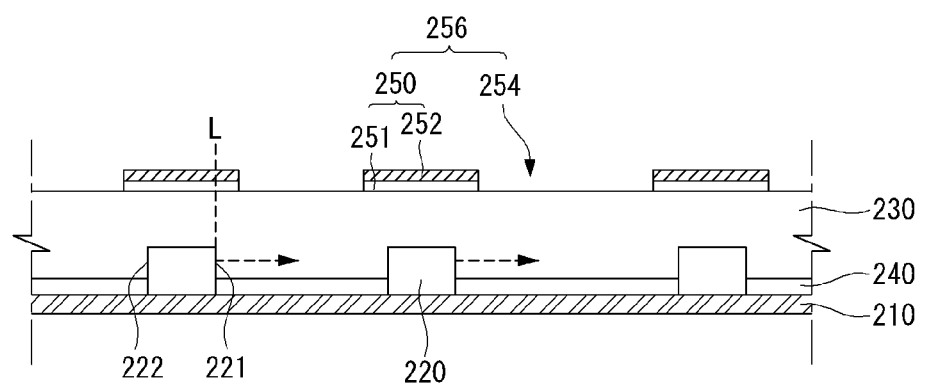
FIGS. 6 to 9 are views illustrating a backlight unit according to an embodiment of this document.

Referring to FIG. 6, a third layer 256 is formed on the second layer 230. The third layer 256 includes a plurality of light shielding patterns 250 positioned to correspond to the respective light sources 220 and a light transmitting region 254 surrounding the light shielding patterns 250.

Specifically, light emitted from the light sources 220 passes through the light transmitting region 254. No light shielding patterns 250 are present at the light transmitting region 254.

The plurality of light shielding patterns 250 are arranged on the second layer 230 to correspond to the respective light sources 220. Each light shielding pattern 250 includes a first light shielding film 251 and a reflection film 252. The first light shielding film 251 contacts the second layer 230, and the reflection film 252 is formed on top of the first light shielding film 251.

The first light shielding film 251 shields at least part of light emitted from the light sources 220. The reflection film 252 reflects at least part of light emitted from the light sources 220.

The light shielding patterns 250 may reduce luminance of light coming from regions adjacent to the light sources 220, thus allowing the backlight unit 200 to provide light having a uniform luminance.

The light shielding patterns 250 selectively shield or reflect light oriented upwards from the light sources 220 to reduce the luminance of light coming from the regions adjacent to the light sources 220 so that the reflected light may spread toward a side surface or a lower surface.

The first light shielding film 251 includes a metal oxide which is a light shielding material. According to an embodiment, the first light shielding film 251 may include any one or more selected from the group consisting of $TiO_2$, $ZnO$, and $CaCO_3$.

According to an embodiment, the first light shielding film 251 may be formed by depositing or coating the metal oxide or by printing a metal oxide ink according to a predetermined pattern. According to an embodiment, the metal oxide ink may be a white or whitish ink.

According to an embodiment, the first light shielding film 251 may be formed to have a color having a high luminance, for example, white.

The reflection film 252 includes a light reflecting material, such as a metal. According to an embodiment, the reflection film 252 may include any one or more selected from the group consisting of aluminum (Al), silver (Ag), gold (Au), platinum (Pt), and magnesium (Mg).

According to an embodiment, the reflection film 252 may be formed by depositing or coating the metal or by printing a metal ink according to a predetermined pattern.

According to an embodiment, the reflection film 252 may have a thickness that stops at least part of light from being transmitted to enhance reflection effects. The thickness of the reflection film 252 may be adjusted to provide a proper luminance of light.

As described above, the light shielding patterns 250 shield or reflect light from the light sources 220, thus allowing the backlight unit to provide light of uniform luminance.

According to an embodiment, the first light shielding film 251 and the reflection film 252 may be the same in size. According to an embodiment, the term "size" may mean an area of a surface of the first light shielding film 251 and the reflection film 252. For example, the first light shielding film 251 and the reflection film 252 may be stacked one over another with the same area.

Figure 7:
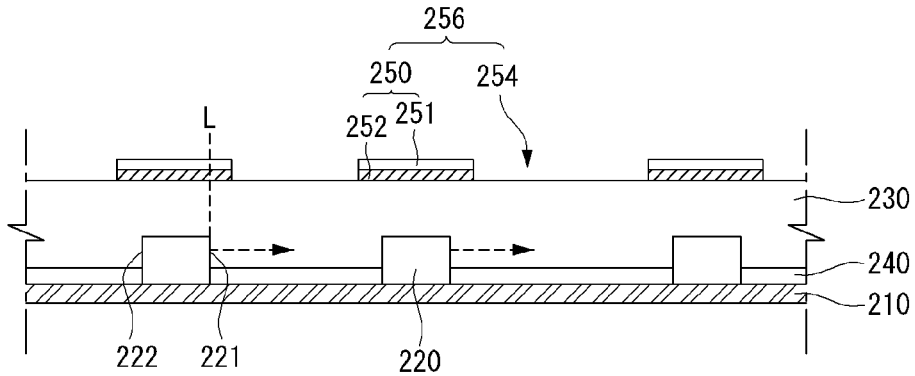

Referring to FIG. 7, the order of the first light shielding film 251 and the reflection film 252 is reversed. Specifically, the reflection film 252 is formed on the second layer 230, and the first light shielding film 251 is formed on the reflection film 252. As a result, light emitted from the light source 220 is reflected by the reflection film 252, and light passing through the reflection film 252 is reflected or shielded by the first light shielding film 251.

According to an embodiment, the light shielding patterns 250 may be positioned so that centers of the light shielding patterns 250 may be consistent with centers of the respective light sources 220. According to an embodiment, the light shielding patterns 250 may be formed to cover the entire surface of the respective light sources located under the light shielding patterns 250.

Light emitted from a light source 220 has a maximum luminance at its light emission surface 221. Accordingly, if a light shielding pattern 250 is located over the light emission surface 221 of the light source 220, luminance of light may be reduced at the light emission surface 221 of the light source 220. Since each light source 220 emanates light toward its adjacent light source 220, light reaching a rear surface 222 of a light source 220 is reflected by the light source 220 or the reflection layer 240 adjacent to the light source 220, thus preventing light luminance from increasing at the rear surface 222 of the light source 220.

As such, according to an embodiment, the light shielding pattern 250 may be positioned to cover the light emission surface 221 and the rear surface 222 of its corresponding light source 220.

Alternately, the light shielding pattern 250 may be located to be biased toward a direction in which light is emitted from the light source 220 to reduce luminance of light at the light emission surface 221 of the light source 220.

Figure 8:
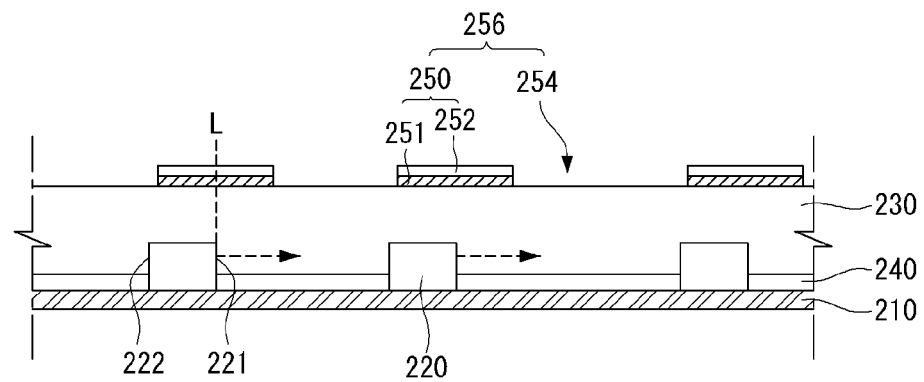

As shown in FIG. 8, the light shielding patterns 250 are positioned so that centers of the light shielding patterns 250 comply with extension lines L of the respective light sources 220. For example, the light shielding patterns 250 in FIG. 8 may be located to be further biased toward the light emission surfaces 221 of the respective light sources 220 than the light shielding patterns 250 in FIG. 7.

Figure 9:
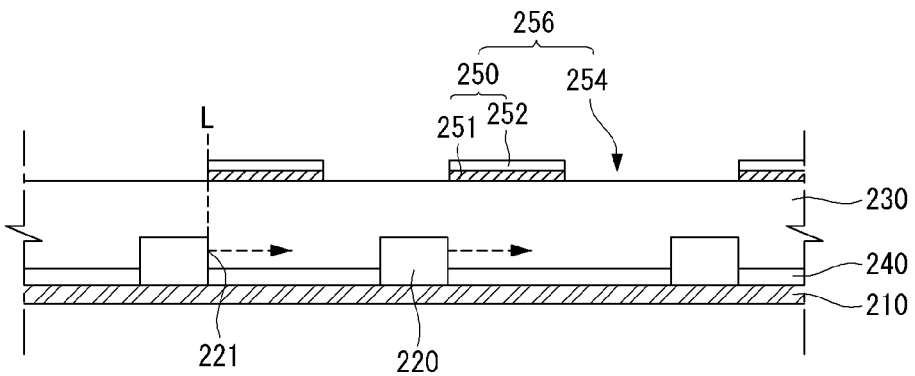

Further, as shown in FIG. 9, the light shielding patterns 250 are positioned so that ends of the light shielding patterns 250 comply with extension lines L of the light emission surfaces 221 of the respective light sources 220. For example, the light shielding patterns 250 in FIG. 9 may be located to be further biased in the direction of light emission than the light shielding patterns 250 in FIG. 8.

As such, since in the backlight unit described in connection with FIGS. 6 to 9 the light transmitting region 254 and the light shielding patterns 250 are formed on the second layer 230, light luminance may be reduced at regions adjacent to the light emission surfaces 221 of the light sources 220, thus enhancing uniformity of luminance of the backlight unit.

FIGS. 10 to 13 are views illustrating a backlight unit according to an embodiment of this document.

Figure 10:
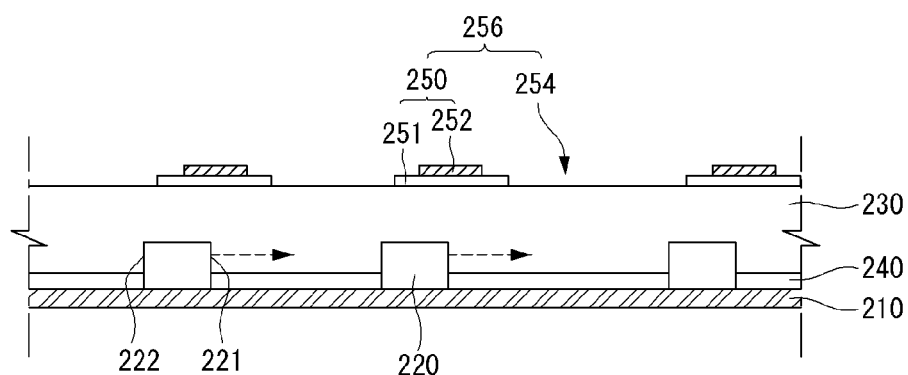
FIGS. 10 to 13 are views illustrating a backlight unit according to an embodiment of this document.

Referring to FIG. 10, a backlight unit according to an embodiment of this document includes a first layer 210 on which a plurality of light sources 220 are arranged, a reflection layer 240 formed on a surface of the first layer 210 and surrounding the plurality of light sources 220, a second layer 230 covering the reflection layer 240 and the light sources 220, and a third layer 256 formed on the second layer 230. The third layer 256 includes a plurality of light shielding patterns 250 positioned to correspond to the respective light sources 220 and light transmitting region 254 surrounding the light shielding patterns 250

Each light shielding pattern 250 includes a reflection film 252 and a first light shielding film 251 that are different in area from each other.

Specifically, the first light shielding film 251 is formed on the second layer 230, and the reflection film 252 is formed on the first light shielding film 251. An area of the reflection film 252 is smaller than an area of the first light shielding film 251. The reflection film 252 is positioned at a center off the first light shielding film 251.

Unlike the embodiment described in connection with FIGS. 6 to 9, the reflection film 252 is formed over the light emission surface 221 of the light source 220 but not over a portion of the light source which is away from the light emission surface 221.

For example, in consideration of luminance being high at the light emission surface 221 through which light is emitted from the light source 220, the reflection film 252 is formed over a portion of the light source 220 which is adjacent to the light emission surface 221 but is not formed over a portion of the light source 220 which is away from the light emission surface 221. Accordingly, manufacturing costs of the reflection films 252 may be saved and light luminance may be reduced at the light emission surface 221 of the light source 220.

Light reflected by the rear surface 222 of the light source 220 may be reflected again by the first light shielding film 251, thus decreasing luminance of light at the rear surface 222 of the light source 220.

Figure 11:
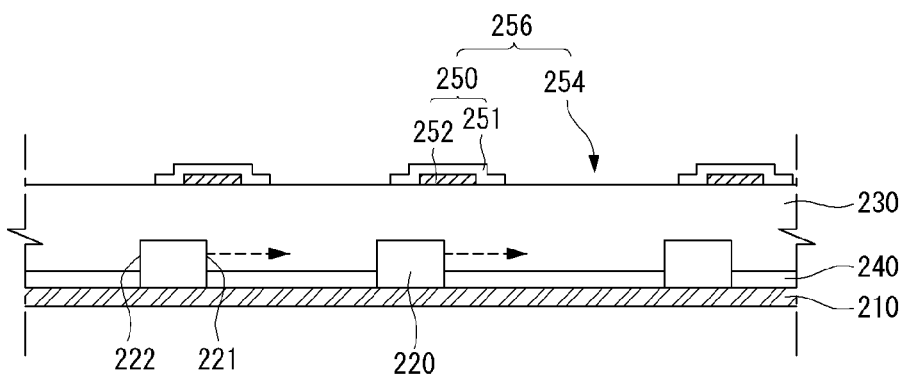

Alternately, the order of the first light shielding film 251 and the reflection film 252 may be reversed as shown in FIG. 11. For example, the reflection film 252 is formed on the second layer 230, and the first light shielding film 251 is formed on the reflection film 252.

The reflection film 252 is formed to be smaller in area than the first light shielding film 251 so that the first light shielding film 251 covers the reflection film 252 and contacts the second layer 230.

According to an embodiment, an area of the reflection film 252 may be less than 50% of an area of the first light shielding film 251. For example, the area of the reflection film 252 may be 10% to 50% of the area of the first light shielding film 251.

If the area of the reflection film 252 is more than 10% of the area of the first light shielding film 251, luminance of light may be reduced at the light emission surface 221 of the light source 220, and if the area of the reflection film 252 is less than 10% of the area of the first light shielding film 251, manufacturing costs of the reflection film 252 may be reduced and in a case where the reflection film 252 is formed of an ink, a time for drying the ink may be saved.

Figure 12:
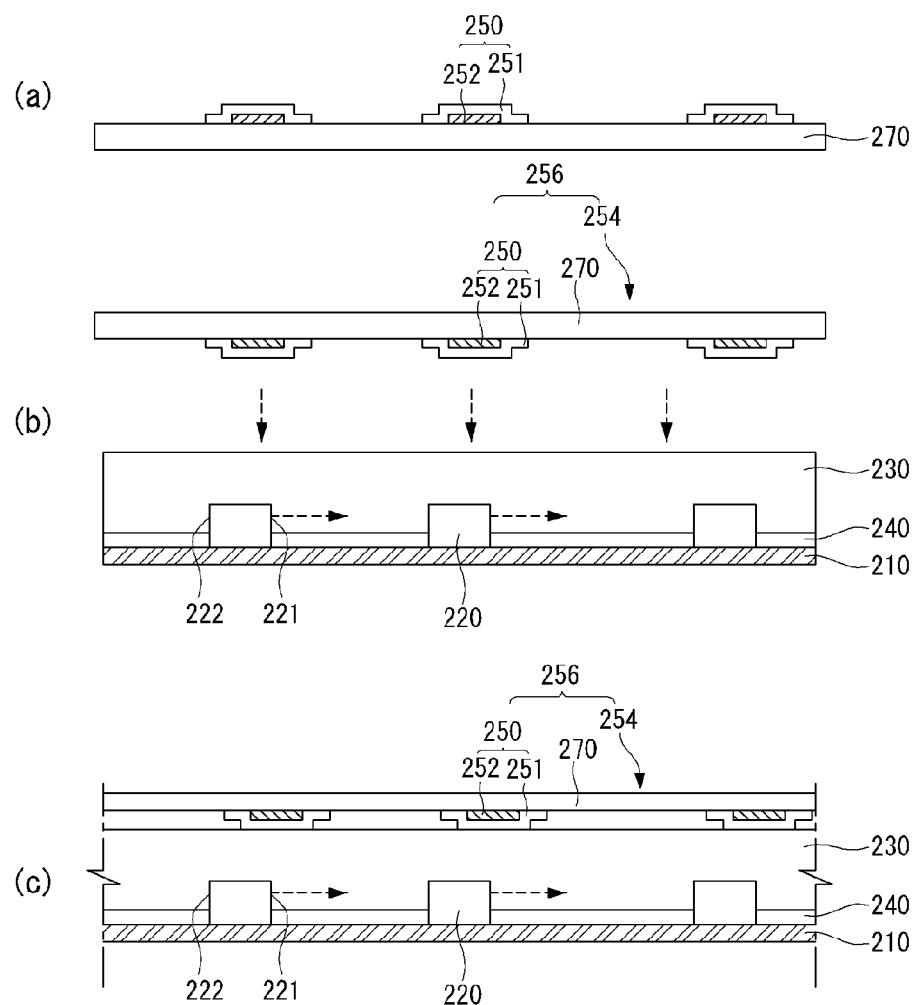

According to an embodiment, the third layer 256 may further include a transparent film 270 as shown in FIG. 12. According to an embodiment, the light shielding pattern 250 may be formed on the transparent film 270 before being attached on the second layer 230.

A method of manufacturing light shielding patterns 250 will now be described with reference to FIG. 12. Referring to (a) of FIG. 12, reflection films 252 are formed on a transparent film 270 by deposition, printing, or coating, and then first light shielding films 251 are formed to cover the respective reflection films 252. According to an embodiment, the first light shielding film 251 may be formed of a white ink containing a metal oxide, and the reflection film 252 may be formed of an ink containing a metal.

Figure 54:
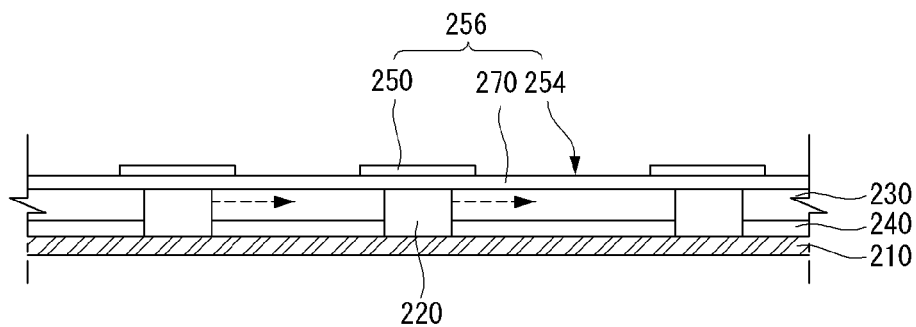
FIG. 54 is a view illustrating a backlight unit according to an embodiment of this document.

The light shielding patterns 250 are attached on the second layer 230 while the light sources 220 are aligned with the respective light shielding patterns 250 as shown in (b) of FIG. 12, thus completing a backlight unit as shown in (c) of FIG. 12. According to an embodiment, the transparent film 270 may be directly attached to the second layer 230, thus completing a backlight unit in which the second layer 230, the transparent film 270, and the light shielding patterns 250 are sequentially arranged as shown in FIG. 54.

As such, in this backlight unit, the first light shielding films 251 are provided on the second layer 230, and the reflection films 252 are formed on the respective first light shielding films 251 to cover the respective first light shielding films 251. According to an embodiment, the transparent film 270 may remain, as is, or may be removed later.

Although it has been illustrated in (c) of FIG. 12 that edges of each first light shielding film 251 do not contact the second layer 230, the edges may be alternately brought in contact with the second layer 230, for example, depending on how much pressure is exerted to the transparent film 270.

According to an embodiment, a backlight unit may be formed that is different from the backlight unit shown in FIG. 12.

A method of manufacturing light shielding patterns 250 will now be described with reference to FIG. 13. As shown in (a) of FIG. 13, first light shielding films 251 are formed on a transparent film 270 using deposition, printing, or coating, and reflection films 252 are formed on the respective first light shielding films 251 so that the reflection films 252 are aligned with centers of the respective first light shielding films 251.

Figure 13:
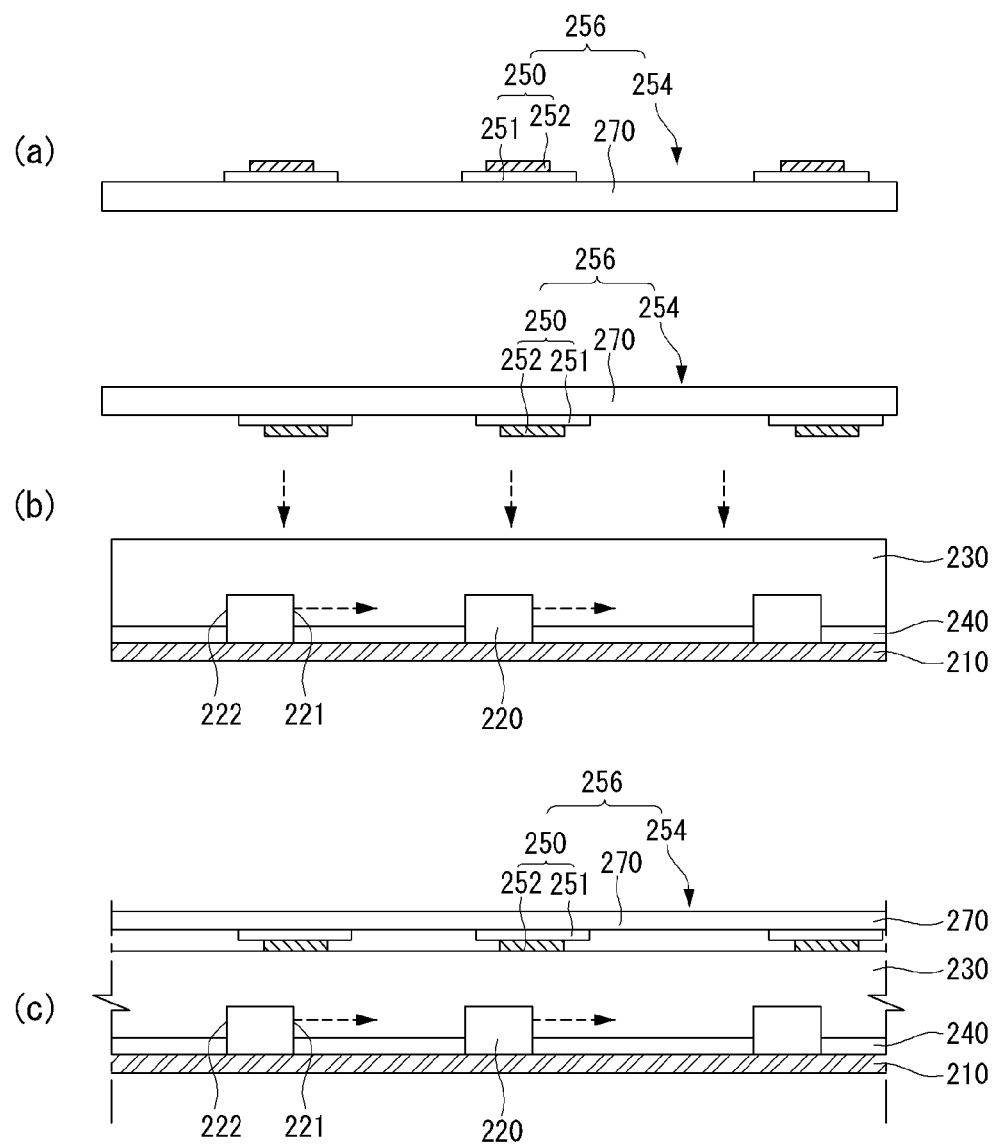

Then, as shown in (b) of FIG. 13, light sources 220 are aligned with the respective corresponding light shielding patterns 250. Thereafter, the transparent film 270 is attached to the second layer 230 with the light shielding patterns 250 toward the second layer 230, thus completing a backlight unit as shown in (c) of FIG. 13.

As such, in the present backlight unit, the reflection films 252 are formed on the second layer 230, and the first light shielding films 251 are formed on the respective reflection films 252. According to an embodiment, the transparent film 270 may remain, as is, or may be removed later.

Although it has been illustrated in (c) of FIG. 13 that edges of each first light shield film 251 does not contact the second layer 230, the edges may be alternately brought in contact with the second layer 230, for example, depending on how much pressure is exerted to the transparent film 270.

According to an embodiment, each light shielding pattern 250 may sequentially include a first light shielding film, a reflection film, and a second light shielding film.

FIGS. 14 to 18 are views illustrating a backlight unit according to an embodiment of this document. The same reference numerals may be used to denote the same or substantially the same elements as those described in connection with FIGS. 6 to 13.

Figure 14:
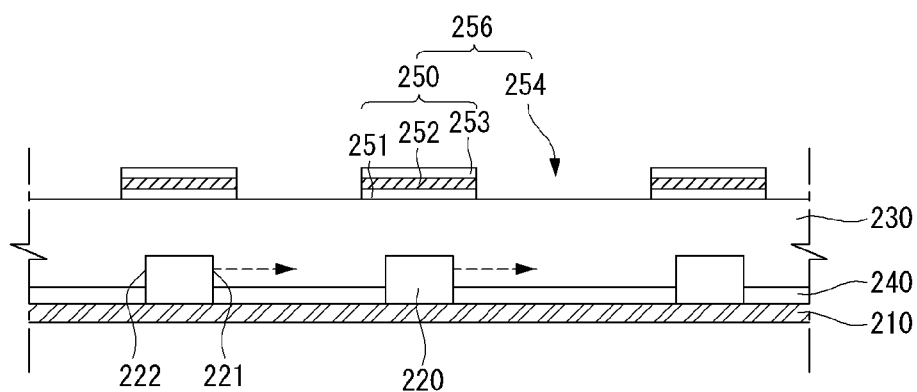
FIGS. 14 to 18 are views illustrating a backlight unit according to an embodiment of this document.

Referring to FIG. 14, a third layer 256 is formed on the second layer 230. The third layer 256 includes a plurality of light shielding patterns 250 positioned to correspond to the respective light sources 220 and light transmitting region 254 surrounding the plurality of light shielding patterns 250.

Specifically, the plurality of light shielding patterns 250 are formed on the second layer 230 to correspond to the respective light sources 220. Each light shielding pattern 250 includes a first light shielding film 251, a reflection film 252 on the first light shielding film 251, and a second light shielding film 253 on the reflection film 252. The first light shielding film 251 is formed to contact the second layer 230.

The first light shielding film 251 and the second light shielding film 253 shield at least a part of light emitted from the light source 220, and the reflection film 252 reflects at least a part of light emitted from the light source 220.

The light shielding patterns 250 are formed on the second layer 230 to reduce luminance of light emitted from regions adjacent to the light sources 220, so that light of uniform luminance may be emitted from the backlight unit 200.

For example, the light shielding patterns 250 positioned at the respective corresponding light sources 220 on the second layer 230 selectively shield or reflect light emitted upwards from the light sources 220 so that luminance of light coming from regions adjacent to the light sources 220 may be reduced and the reflected light may be diffused toward a side surface or a lower surface.

According to an embodiment, the second light shielding film 253 may include a light shielding material, such as a metal oxide, like the first light shielding film 251. For example, the metal oxide may include any one or more selected from the group consisting of $TiO_2$, $ZnO$, and $CaCO_3$.

According to an embodiment, the second light shielding film 253 may be formed by deposition or coating of the metal oxide or by printing, e.g., a metal oxide ink according to a predetermined pattern. According to an embodiment, the metal oxide ink may be a white or whitish ink.

According to an embodiment, the first and second light shielding films 251 and 252 may be formed to have a color having a high luminance, for example, white.

As such, the light shielding patterns 250 may shield or reflect light emitted from the light sources 220 to allow the backlight unit to provide a uniform light luminance.

Figure 15:
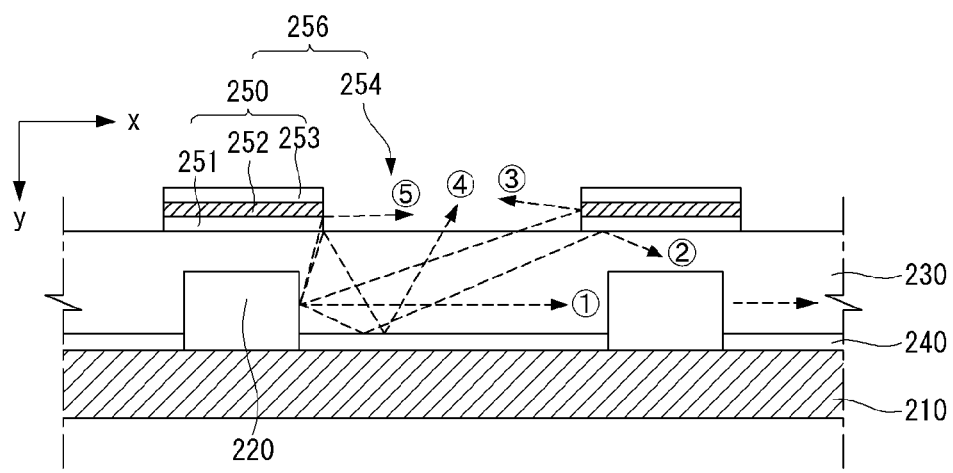

FIG. 15 is a view illustrating paths of light beams emitted from light sources.

Referring to FIG. 15, a light beam ① emitted from a first light source 220 in a direction parallel to the first layer 210, for example, in a x-axial direction, travels toward a second light source 220 adjacent to the first light source 220 and is then reflected by the second light source 220. A light beam ② from the first light source 220 is reflected by the reflection layer 240 and then by a first light shielding film 251 of a second light shielding pattern 250 arranged over the second light source 220, and then enters into the second layer 230.

A light beam ③ from the first light source 220 reaches a reflection film 252 of the second light shielding pattern 250 via 230, and is then reflected by the reflection film 252 to travel in the light transmitting region 254. A light beam ④ from the first light source 220 is reflected toward the reflection layer 240 by a first light shielding film 251 of a first light shielding pattern 250 arranged over the first light source 220, reflected again by the reflection layer 240, and then travels in the light transmitting region 254.

A light beam ⑤ from the first light source 220 passes through the first light shielding film 251 of the first light shielding pattern 250, is reflected by the reflection film 252, and then travels in the light transmitting region 254.

For example, the light shielding pattern 250 may reflect entirety of light coming through the first light shielding film 251 and the second light shielding film 253 or may partially reflect and partially transmit light coming through the first light shielding film 251 and the second light shielding film 253. The reflection film 252 may reflect a part of incident light. Such features of the light shielding pattern 250 may be adjusted by controlling light transmittance through the second layer 230 and the first layer 210.

Accordingly, light emitted from the light source 220 may spread over a broad range toward a side direction as well as toward other directions without being concentrated on a upper direction, thus allowing the backlight unit 200 to provide light of uniform luminance.

Turning back to FIG. 14, according to an embodiment, the light shielding pattern 250 may include the first light shielding film 251, the reflection film 252, and the second light shielding film 253 that are of the same size. The term "size" here may refer to an area of the first light shielding film 251, the reflection film 252, and the second light shielding film 253. For example, the first light shielding film 251, the reflection film 252, and the second light shielding film 253 may have the same area.

According to an embodiment, the light shielding patterns 250 may be positioned so that their centers comply with centers of the respective light sources 220. According to an embodiment, the light shielding patterns 250 may be positioned to fully cover the respective corresponding light sources 220.

Light emitted from a light source 220 has the maximum luminance at a light emission surface 221 of the light source 220. Accordingly, luminance of light at the light emission surface 221 of the light source 220 may be reduced by locating a light shielding pattern 250 over the light emission surface 221. A light source 220 directs light toward a neighboring light source 220. Light reaching a rear surface 222 of the neighboring light source 220 is reflected by the neighboring light source 220 or by the reflection layer 240 adjacent to the neighboring light source 220, thus preventing light luminance from increasing at the rear surface 222.

According to an embodiment, the light shielding pattern 250 may be positioned over both the light emission surface 221 and the rear surface 222 of the light source 220.

According to an embodiment, the light shielding pattern 250 may be located to be biased in a direction of emission of light from the light source 220 to reduce luminance of light at the light emission surface 221 of the light source 220.

Figure 16:
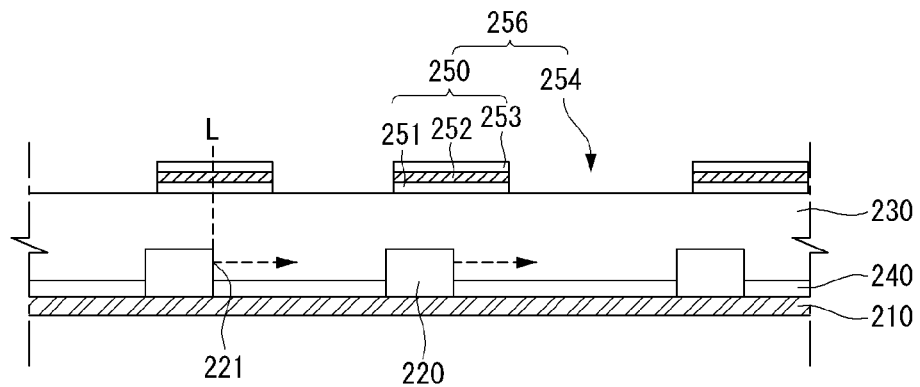

As shown in FIG. 16, light shielding patterns 250 are positioned so that centers of the light shielding patterns 250 comply with extension lines L of light emission surfaces 221 of respective light sources 220. For example, the light shielding patterns 250 shown in FIG. 16 are arranged to be further biased in the direction of light emission than the light shielding patterns 250 in FIG. 14.

Figure 17:
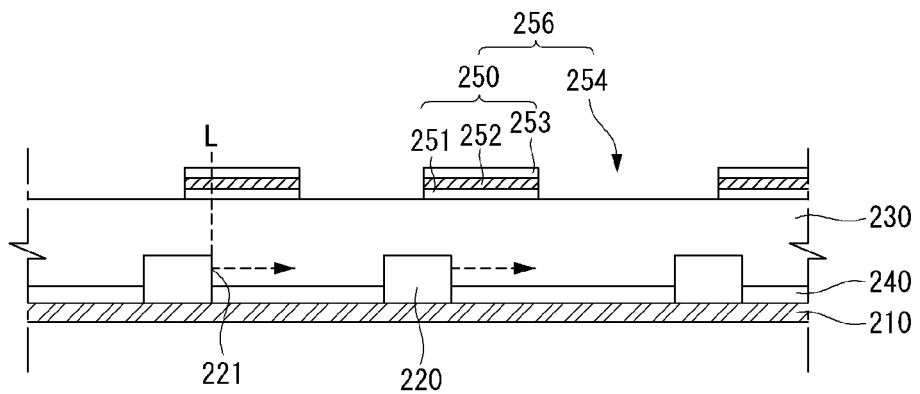

Referring to FIG. 17, the light shielding patterns 250 are positioned so that their centers are biased further in a direction of light emission of the light sources 220 than extension lines L of the light emission surfaces 221 of the respective light sources 220. For example, the light shielding patterns 250 shown in FIG. 17 are arranged to be further biased in the direction of light emission than the light shielding patterns 250 in FIG. 16.

Figure 18:
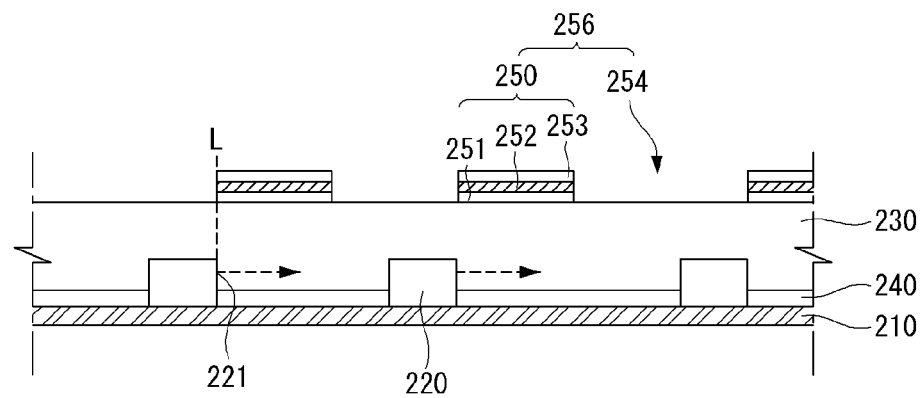

Further, as shown in FIG. 18, the light shielding patterns 250 are positioned so that ends of the light shielding patterns 250 comply with extension lines L of the light emission surfaces 221 of the respective light sources 220. For example, the light shielding patterns 250 in FIG. 18 may be located to be further biased in the direction of light emission than the light shielding patterns 250 in FIG. 17.

As such, the light shielding patterns 250 may reduce light luminance at regions adjacent to the light emission surfaces 221 of the light sources 220, thus allowing the backlight unit to provide uniform luminance.

Figure 19:
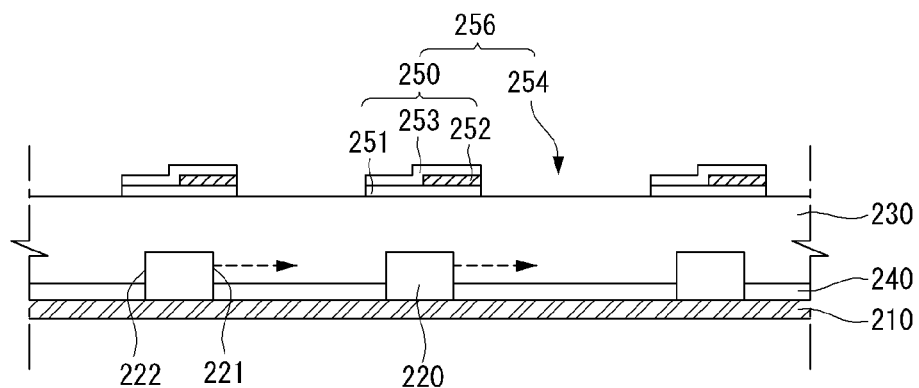
FIGS. 19 to 21 are views illustrating a backlight unit according to an embodiment of this document.
Figure 20:
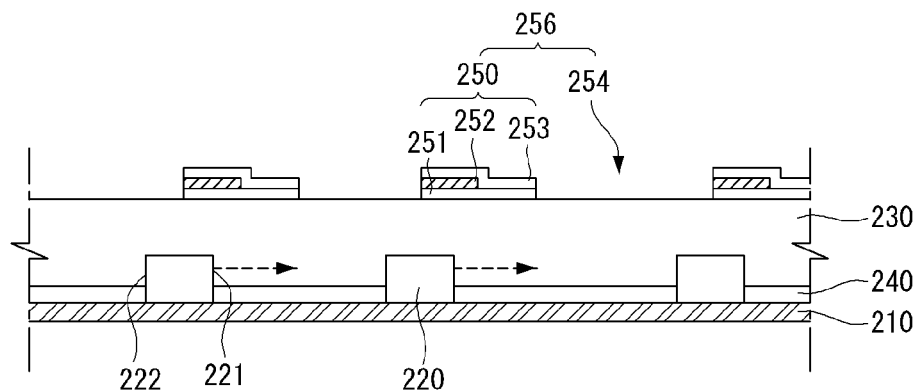
Figure 21:
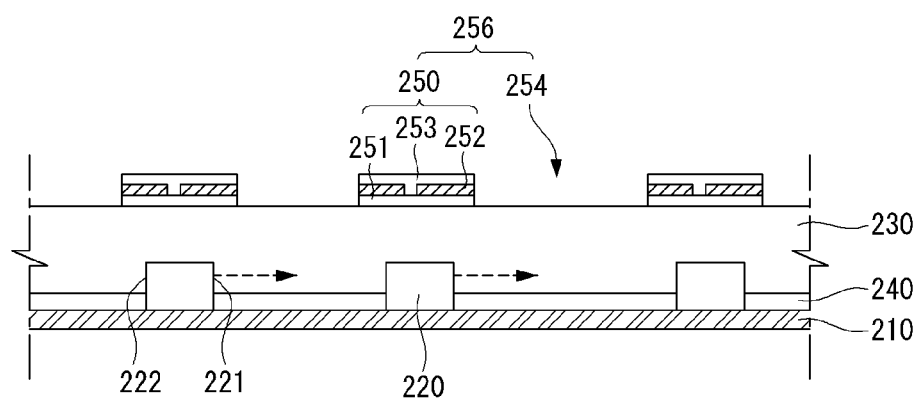

FIGS. 19 to 21 are views illustrating a backlight unit according to an embodiment of this document.

Referring to FIG. 19, a backlight unit according to an embodiment includes a first layer 210, a plurality of light sources 220, a reflection layer 240 formed on the first layer 210 to surround the plurality of light sources 220, a second layer 230 formed on the reflection layer 240 and the light sources 220, and a third layer 256 formed on the second layer 230. The third layer 256 includes a plurality of light shielding patterns 250 positioned to correspond to the respective light sources 220 and light transmitting region 254 surrounding the light shielding patterns 250.

As shown in FIGS. 19 to 21, each light shielding pattern 250 includes a first light shielding film 251, a reflection film 252 formed on the first light shielding film 251, and a second light shielding film 252 formed on the reflection film 252. The reflection film 252 has a different area from an area of the first light shielding film 251 and the reflection film 252. Specifically, the light shielding patterns 250 are positioned to correspond to the respective light sources 220. The first light shielding film 251 is formed to contact the second layer 230. The reflection film 252 has a smaller area than an area of 251. The second light shielding film 253 covers the reflection film 252 and contacts part of the first light shielding film 251.

Unlike the embodiment described in connection with FIGS. 14 to 18, the reflection film 252 is formed over the light emission surface 221 of the light source 220 but not over a portion of the light source which is away from the light emission surface 221.

For example, in consideration of luminance being high at the light emission surface 221 through which light is emitted from the light source 220, the reflection film 252 is formed over a portion of the light source 220 which is adjacent to the light emission surface 221 but is not formed over a portion of the light source 220 which is away from the light emission surface 221. Accordingly, manufacturing costs of the reflection films 252 may be saved and light luminance may be reduced at the light emission surface 221 of the light source 220.

Light reflected by the rear surface 222 of the light source 220 may be reflected again by the first light shielding film 251 and the second light shielding film 253, thus decreasing luminance of light at the rear surface 222 of the light source 220.

In a structure where the light shielding patterns 250 are biased further in the direction of light emission than the light emission surfaces 221 of the light sources 220 as shown in FIG. 20 like the structure shown in FIG. 16, the reflection films 252 are formed over the light emission surfaces 221, and the first and second light shielding films 251 and 253 are biased further in the direction of light emission than the reflection films 252.

For example, in the structure shown in FIG. 20, the reflection film 252 is formed to be adjacent to the light emission surface 221 of the light source 220, for example, over the light emission surface 221, and the first light shielding film 251 and the second light shielding film 253 are formed to be away from the light emission surface 221 of the light source 220 to reduce luminance of light at the light emission surface 221 of the light source 220.

According to an embodiment, an area of the reflection film 252 may be less than 50% of an area of the first light shielding film 251 or the second light shielding film 253. For example, the area of the reflection film 252 may be 10% to 50% of the area of the first light shielding film 251 or the second light shielding film 253.

If the area of the reflection film 252 is more than 10% of the area of the first light shielding film 251 or the second light shielding film 253, luminance of light may be reduced at the light emission surface 221 of the light source 220, and if the area of the reflection film 252 is less than 10% of the area of the first light shielding film 251 or the second light shielding film 253, manufacturing costs of the reflection film 252 may be reduced and in a case where the reflection film 252 is formed of an ink, a time for drying the ink may be saved.

Referring to FIG. 21, each reflection film 252 includes two patterns. According to an embodiment, each reflection film 252 may include two or more patterns.

Specifically, the reflection film 252 includes two patterns on the first light shielding film 251, which are positioned to correspond to the light emission surface 221 and 222, respectively.

For example, no reflection film 252 is formed over a center of the light source 220 since light luminance is not high at the center of the light source 220 while the two patterns of the reflection film 252 are arranged over the light emission surface 221 and the rear surface 222 which have high light luminance.

As a consequence, light luminance may be reduced at the light emission surface 221 and the rear surface 222 of the light source 220 while saving manufacturing costs of the reflection film 252. Thus, it is possible to enhance productivity of the backlight unit.

According to an embodiment, the first light shielding film 251, the reflection film 252, and the second light shielding film 253 may have different sizes.

FIGS. 22 to 25 are views illustrating a backlight unit according to an embodiment of this document.

Figure 22:
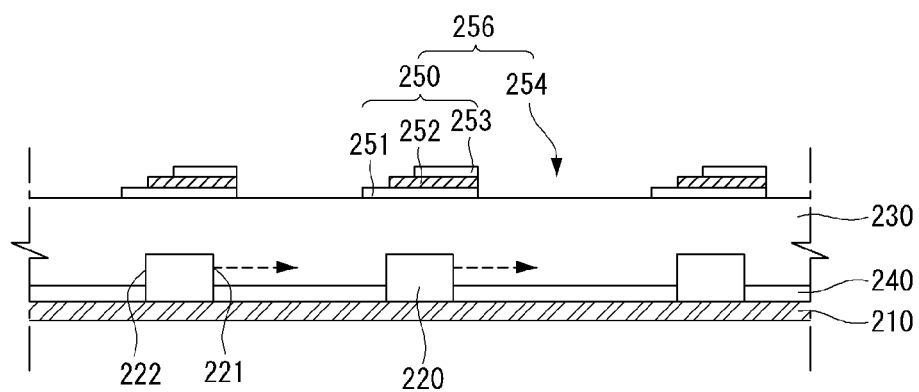
FIGS. 22 to 25 are views illustrating a backlight unit according to an embodiment of this document.

Referring to FIG. 22, a backlight unit according to an embodiment includes a first light shielding film 251, a reflection film 252, and a second light shielding film 253 that have different sizes from each other.

Specifically, the light shielding patterns 250 are formed to correspond the respective light sources 220. The first light shielding film 251 is formed to contact the second layer 230, the reflection film 252 is formed on the first light shielding film 251 to correspond to the light emission surface 221 of the light source 220, and the second light shielding film 253 is formed on the reflection film 252.

A size of the first light shielding film 251 is larger than a size of the reflection film 252 a size of which is larger than a size of the second light shielding film 253. For example, according to the stacking order, the first light shielding film 251 has a largest size, and the second light shielding film 253 has a smallest size.

The first light shielding film 251, the reflection film 252, and the second light shielding film 253 are all positioned over the light emission surface 221 of the light source 220 so that light luminance may be reduced at the light emission surface 221 of the light source 220.

The first light shielding film material 251 and the reflection film 252 are positioned over a region of the light source 220 which is from a center of the light source 220 to the rear surface 222, so that light luminance may be reduced at the region.

Figure 23:
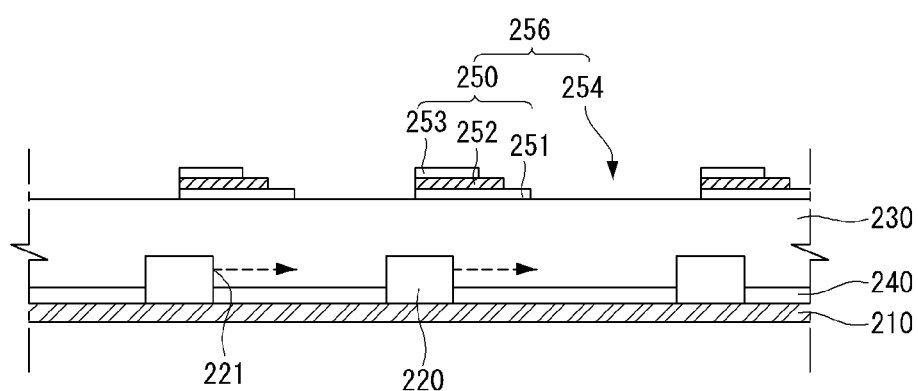

Referring to FIG. 23, unlike in FIG. 22, the size of the first light shielding film 251, the reflection film 252, and the second light shielding film 253 gradually decreases in the order of the first light shielding film 251, the reflection film 252, and the second light shielding film 253 in the direction of light emission from the light emission surface 221.

For example, the first light shielding film 251, the reflection film 252, and the second light shielding film 253 are all positioned over the light emission surface 221, but only the first light shielding film 251 is positioned over a region of the light source 220 which is away from the light emission surface 221 in the direction of light emission.

Figure 24:
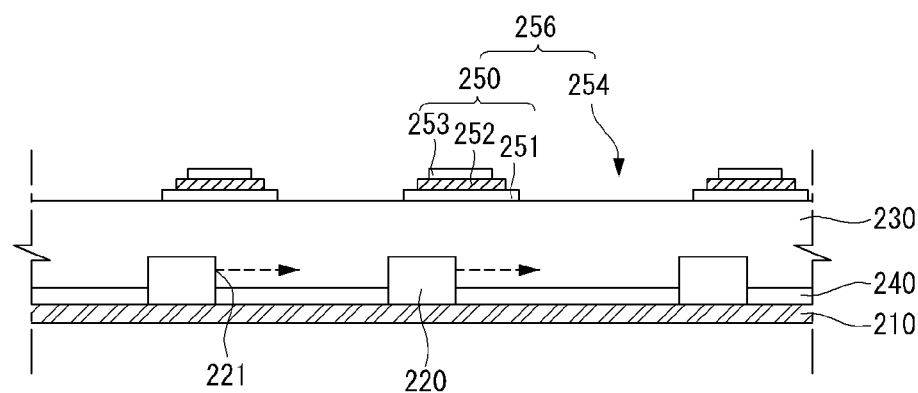

Referring to FIG. 24, the first light shielding film 251, the reflection film 252, and the second light shielding film 253 are sequentially stacked in the form of a pyramid.

Specifically, the first light shielding film 251 contacting the second layer 230 has a largest size. The reflection film 252 formed on the first light shielding film 251 has a size smaller than a size of the first light shielding film 251 and is arranged so that its center complies with a center of the first light shielding film 251. The second light shielding film 253 formed on the reflection film 252 has a size smaller than a size of the reflection film 252 and is arranged so that its center complies with a center of the reflection film 252.

For example, the light shielding pattern 250 is formed in the shape of a pyramid so that the light emission surface 221 and the centers of the first light shielding film 251, the reflection film 252, and the second light shielding film 253 are aligned with one another.

The first light shielding film 251, the reflection film 252, and the second light shielding film 253 are all positioned over the light emission surface 221 of the light source 220 so that light luminance may be reduced at the light emission surface 221 of the light source 220.

According to an embodiment, after being formed on a transparent film 270, the light shielding patterns 250 may be formed on the second layer 230 as described in connection with FIGS. 12 and 13.

A method of manufacturing the third layer 256 will now be described with reference to FIG. 25. As shown in (a) of FIG. 25, the second light shielding film 253 is formed on a transparent film 270 by deposition, printing, or coating. The reflection film 252 is formed on the second light shielding film 253 to have a smaller size than a size of the second light shielding film 253, and the first light shielding film 251 is formed on the reflection film 252 to cover the reflection film 252.

Figure 25:
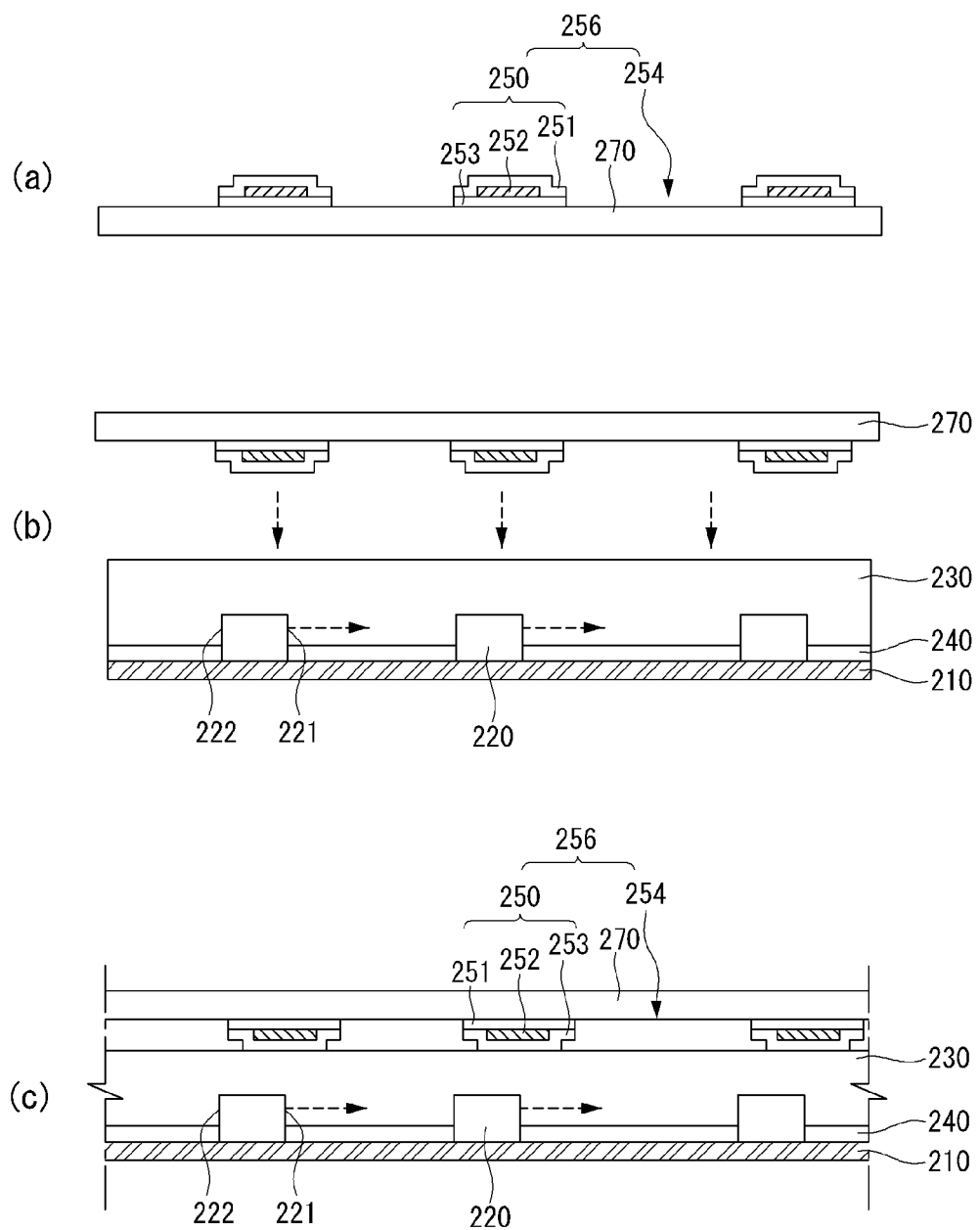

The light shielding patterns 250 are attached on the second layer 230 while the light sources 220 are aligned with the respective light shielding patterns 250 as shown in (b) of FIG. 25, thus completing a backlight unit as shown in (c) of FIG. 25. According to an embodiment, the transparent film 270 may be directly attached to the second layer 230, thus completing a backlight unit in which the second layer 230, the transparent film 270, and the light shielding patterns 250 are sequentially arranged as shown in FIG. 54.

As such, in this backlight unit, the first light shielding films 251 are provided on the second layer 230, and the reflection films 252 are formed on the respective first light shielding films 251 to cover the respective first light shielding films 251. The second light shielding films 253 are respectively formed on the reflection films 252 and the first light shielding films 251. According to an embodiment, the transparent film 270 may remain, as is, or may be removed later.

Although it has been illustrated in (c) of FIG. 25 that edges of each first light shielding film 251 do not contact the second layer 230, the edges may be alternately brought in contact with the second layer 230, for example, depending on how much pressure is exerted to the transparent film 270.

Figure 26:
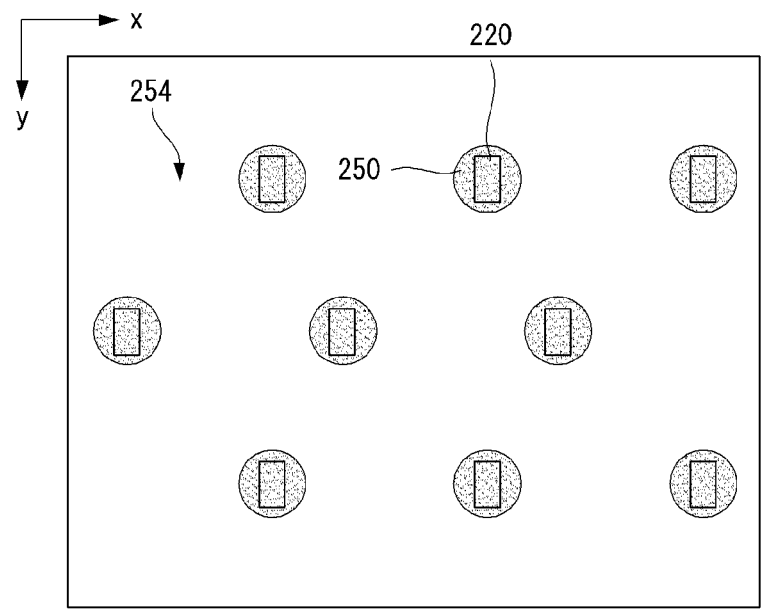
FIGS. 26 to 28 are plan views illustrating a light transmitting region and light shielding patterns included in a backlight unit according to an embodiment of this document.
Figure 27:
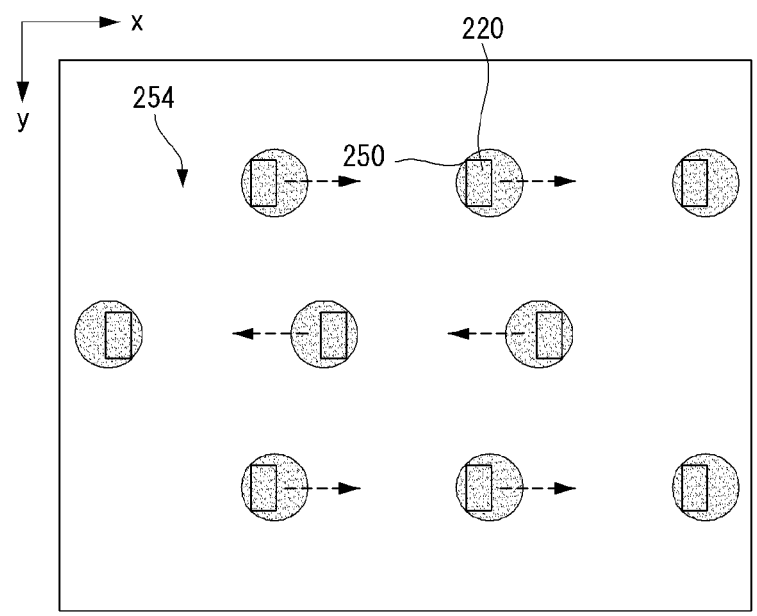
Figure 28:
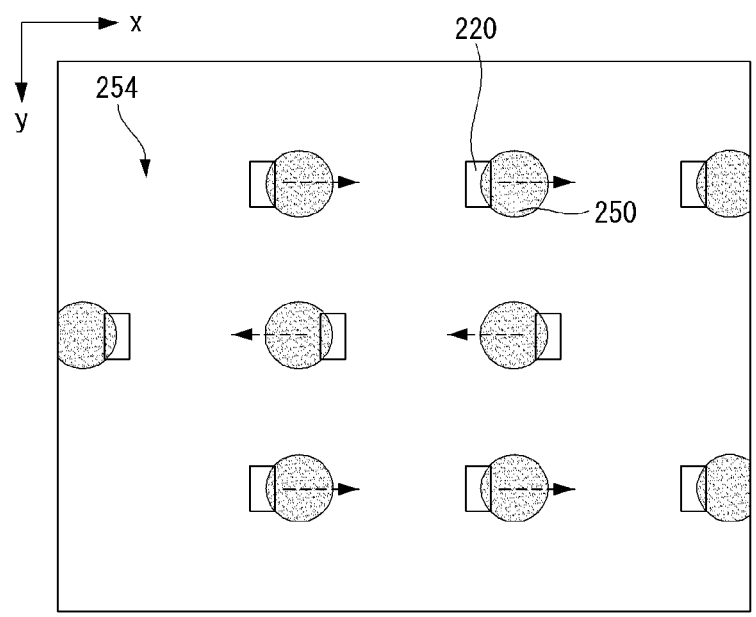

FIGS. 26 to 28 are plan views illustrating a light transmitting region and light shielding patterns included in a backlight unit according to an embodiment of this document.

Referring to FIG. 26, the light shielding pattern 250 has a circular or elliptical shape with respect to its corresponding light source 220. A center of the light shielding pattern 250 complies with a center of the light source 220. According to an embodiment, the light shielding pattern 250 may have the same or different shapes or sizes.

Referring to FIG. 27, the light shielding pattern 250 is slightly shifted in the direction of light emission, for example, in the x-axial direction, so that its center is biased by a predetermined distance in the direction of light emission with respect to a center of the corresponding light source 220.

Referring to FIG. 28, the light shielding pattern 250 is further shifted in the direction of light emission than the light shielding pattern 250 shown in FIG. 27, so that only a part of the light source 220 overlaps the light shielding pattern 250.

Figure 29:
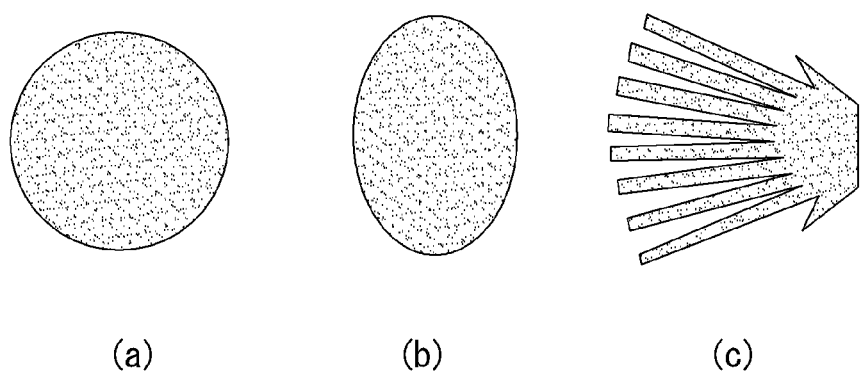
FIG. 29 is a view illustrating a few light shielding patterns having different shapes according to an embodiment of this document.

FIG. 29 is a view illustrating a few light shielding patterns having different shapes according to an embodiment of this document.

Referring to FIG. 29, the light shielding pattern 250 may have a circular shape as shown in (a) of FIG. 29 and an elliptical shape as shown in (b) of FIG. 29 with respect to the corresponding light source 220. Reflection features of the light shielding pattern 250 may be adjusted depending on the location of the first light shielding film, the second light shielding film, and the reflection film as the light shielding pattern 250 goes from a center to an outside. For example, reflectivity of the light shielding pattern 250 may gradually decrease in the direction from the center of the light shielding pattern 250 to the outside.

On the contrary, the light transmittance or aspect ratio of the light shielding pattern 250 may increase in the direction from the center to the outside. Accordingly, the light shielding pattern 250 may have the maximum reflectivity (for example, most of light does not pass through a corresponding region) and the minimum light transmittance and aspect ratio at a region where the corresponding light source 220 is formed, specifically, at the center of the light shielding pattern 250, which corresponds to a center of the light source 220. Resultantly, it may be possible to more effectively prevent a hot spot from occurring at the region where the light source 220 is formed due to concentration of light.

For example, according to an embodiment, a center of the light shielding pattern 250 which overlaps the light source 220 may have an aspect ratio less than 5% to prevent the hot spot.

As shown in (c) of FIG. 29, the light shielding pattern 250 is shaped to have a plurality of elongated protrusions protruding in the direction of light emission. Light may be shielded or reflected at a region where light is emitted by the light shielding pattern 250, and light may be partially transmitted or partially reflected along the direction of light emission by the plurality of protrusions, thus preventing a hot spot from occurring at a region adjacent to the light source.

Figure 30:
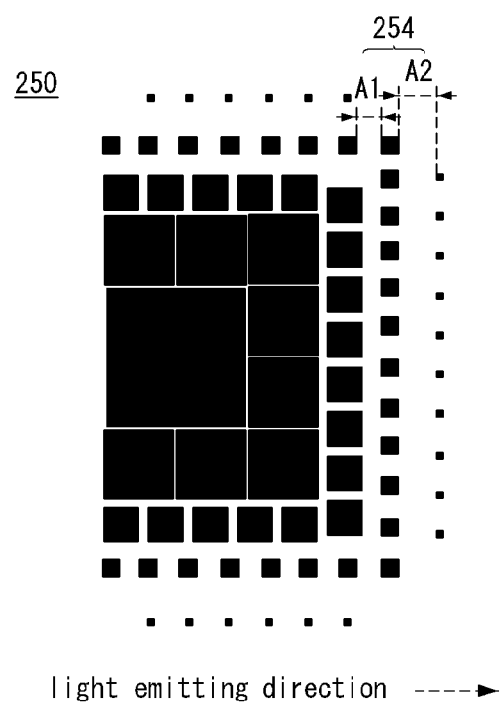
FIGS. 30 to 32 illustrate a backlight unit and light shielding patterns according to embodiments of this document.
Figure 31:
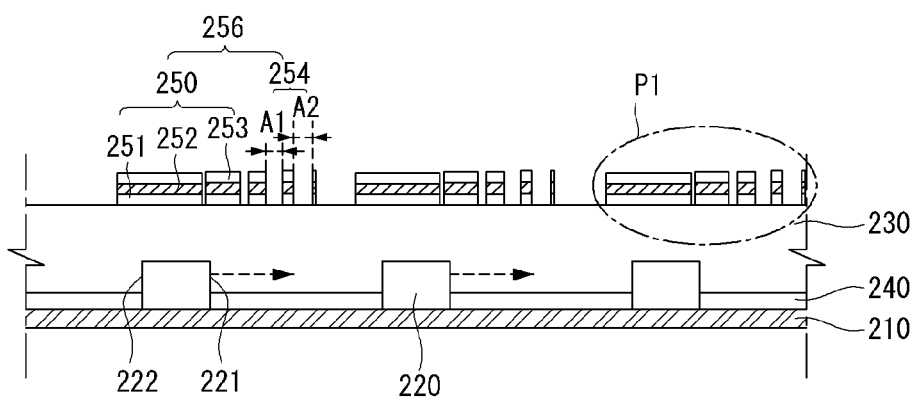
Figure 32:
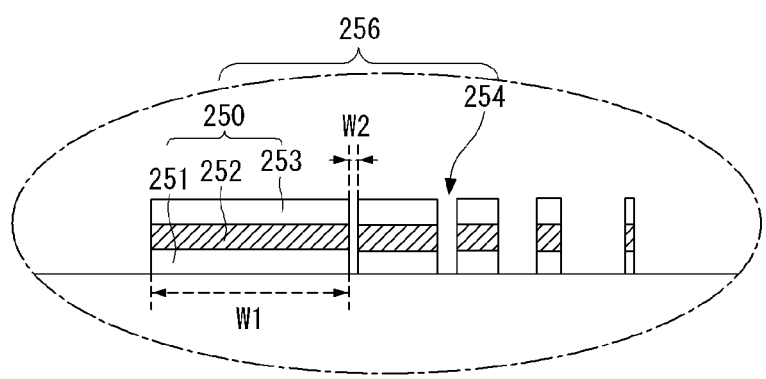

FIGS. 30 to 32 illustrate a backlight unit and light shielding patterns according to embodiments of this document.

FIG. 30 is a plan view illustrating light shielding patterns according to an embodiment of this document. FIG. 31 is a view illustrating a backlight unit having light shielding patterns according to an embodiment of this document. FIG. 32 is an expanded view illustrating region P1 of FIG. 31.

Referring to FIGS. 30 and 31, a third layer 256 according to an embodiment includes a plurality of light shielding patterns 250 and a light transmitting region 254 surrounding the plurality of light shielding patterns 250. The light transmitting region 254 includes a first region A1 adjacent to the light source 220 and a second region A2 away from the light source 220. The first region Al is smaller in area than the second region A2. The light transmitting region 254 includes regions between the plurality of light shielding patterns 250.

Specifically, referring to FIG. 31, a backlight unit according to an embodiment includes a first layer 210, a plurality of light sources 220 on the first layer 210, a reflection layer 240 on the first layer 210 to surround the plurality of light sources 220, a second layer 230 covering the reflection layer 240 and the light sources 220, and the light transmitting region 254 and the plurality of light shielding patterns 250 on the second layer 230.

As described above, the first region A1 is smaller in area than the second region A2. According to an embodiment, as a distance from the light source 220 increases, an area occupied by the light transmitting region 254 may increase or may first increase and may be then maintained as is since a predetermined distance.

Each light shielding pattern 250 includes a first light shielding film 251, a reflection film 252, and a second light shielding film 253 that are sequentially stacked.

As the light shielding patterns 250 are away from the light source 220 in the direction of light emission, widths of the light shielding patterns 250 decrease and intervals between the light shielding patterns 250 increase. For example, as a distance from the light source 220 increases in the direction of light emission, more and more portions of the light transmitting region 254 show up.

More specifically, as shown in FIG. 32, among the light shielding patterns 250, a light shielding pattern 250 closest to the light emission surface 221 of the light source 220 has a largest width W1. The widths W1 of the light shielding patterns 250 decrease in the direction of light emission. Further, intervals W2 between two neighboring light shielding patterns 250 increase as the light shielding patterns 250 are away from the light source 220, for example, in the direction of light emission.

Since an area occupied by the light transmitting region 254 increases in the direction of light emission while light luminance may be reduced at the light emission surface 221 of the light source 220, luminance of light may be made uniform at the regions adjacent to and away from the light source 220, thus allowing the backlight unit to provide uniform light luminance.

Figure 33:
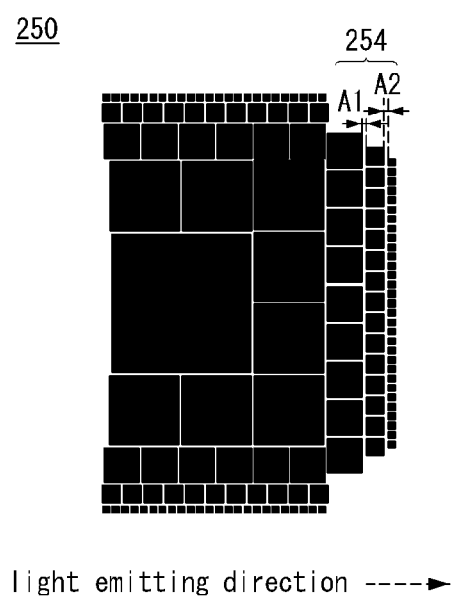
FIGS. 33 to 35 illustrate a backlight unit and light shielding patterns according to embodiments of this document.
Figure 34:
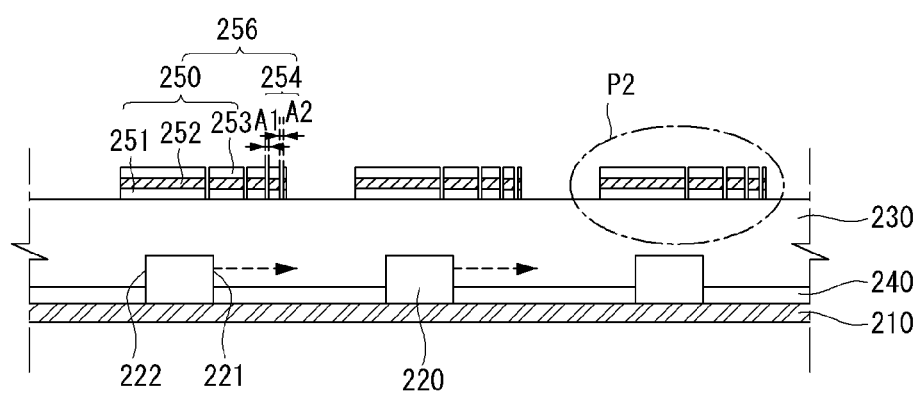
Figure 35:
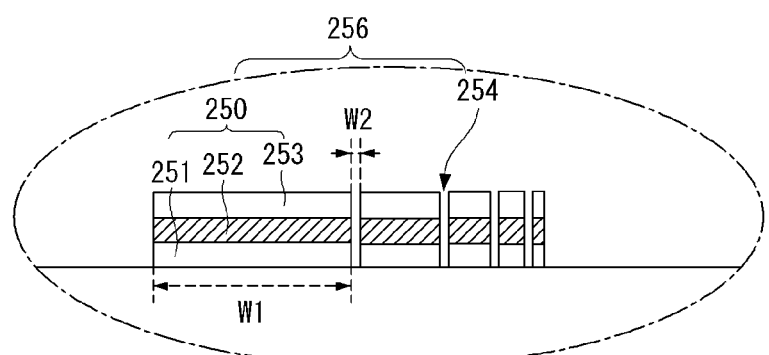

FIGS. 33 to 35 illustrate a backlight unit and light shielding patterns according to embodiments of this document.

FIG. 33 is a plan view illustrating light shielding patterns according to an embodiment of this document. FIG. 34 is a view illustrating a backlight unit having light shielding patterns according to an embodiment of this document. FIG. 35 is an expanded view illustrating region P2 of FIG. 34.

Referring to FIGS. 33 and 34, the light transmitting region 254 includes a first region A1 adjacent to the light source 220 and a second region A2 away from the light source 220. The first region A1 is smaller in area than the second region A2. According to an embodiment, as a distance from the light source 220 increases, an area occupied by the light transmitting region 254 may increase or may first increase and may be then maintained as is since a predetermined distance.

Widths W1 of the light shielding patterns 250 decrease as the light shielding patterns 250 are away from the light source 220, and intervals between two neighboring light shielding patterns 250 remain constant. For example, as the widths W1 of the light shielding patterns 250 decrease, more and more portions of the light transmitting region 254 appear.

More specifically, referring to FIG. 35, among the light shielding patterns 250, a light shielding pattern 250 closest to the light emission surface 221 of the light source 220 has a largest width W1. The widths W1 of the light shielding patterns 250 gradually decrease as the light shielding patterns 250 are away from the light source 220. Intervals W2 of two neighboring light shielding patterns 250 remain constant.

Accordingly, light luminance may be reduced at the light emission surface 221 of the light source 220, and an area occupied by the light transmitting region 254 increases in the direction away from the light source 220. Referring to FIG. 33, it can be seen that aperture ratios increase as the widths of the light shielding patterns 250 decrease although the light shielding patterns 250 have the same interval.

Thus, light luminance is made uniform at regions adjacent to the light source 220 and away from the light source 220, thus allowing the backlight unit to provide light of uniform luminance.

Figure 36:
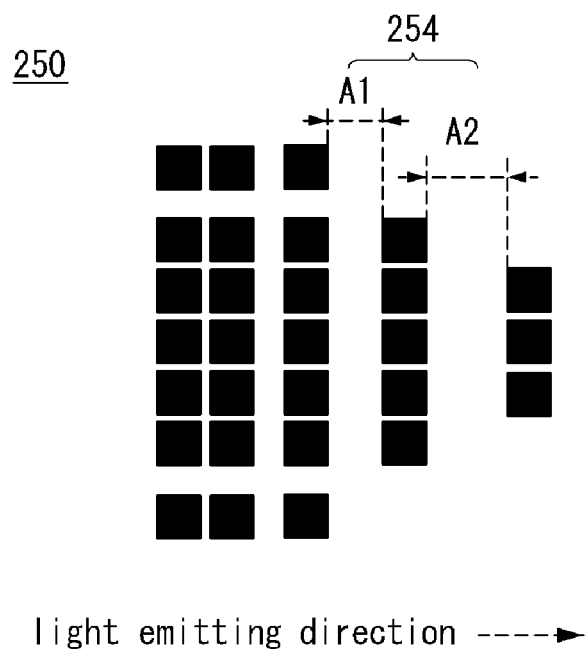
FIGS. 36 to 38 illustrate a backlight unit and light shielding patterns according to embodiments of this document.
Figure 37:
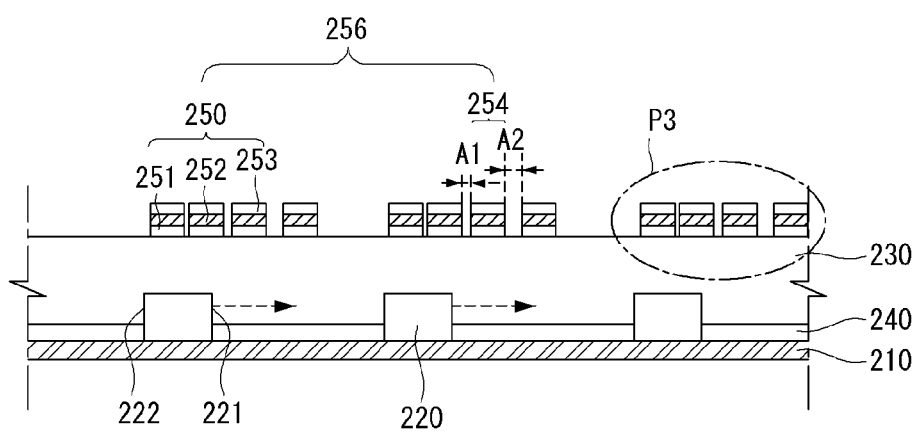
Figure 38:
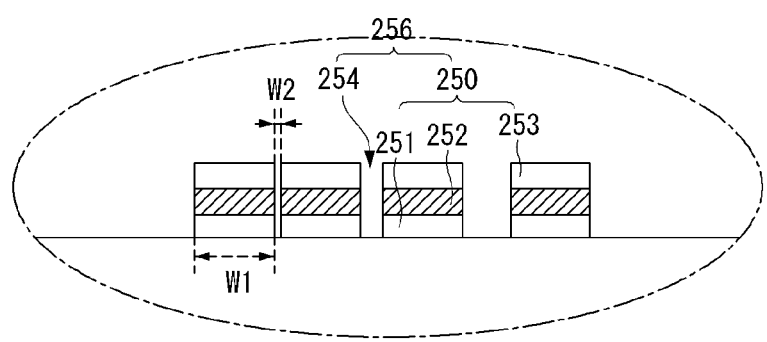

FIGS. 36 to 38 illustrate a backlight unit and light shielding patterns according to embodiments of this document.

FIG. 36 is a plan view illustrating light shielding patterns according to an embodiment of this document. FIG. 37 is a view illustrating a backlight unit having light shielding patterns according to an embodiment of this document. FIG. 38 is an expanded view illustrating region P3 of FIG. 37.

Referring to FIGS. 36 and 37, the light transmitting region 254 includes a first region A1 adjacent to the light source 220 and a second region A2 away from the light source 220. The first region A1 is smaller in area than the second region A2. According to an embodiment, as a distance from the light source 220 increases, an area occupied by the light transmitting region 254 may increase or may first increase and may be then maintained as is since a predetermined distance.

The light shielding patterns 250 are of the same width W1 and as the light shielding patterns 250 are away from the light source 220, intervals W2 between two neighboring light shielding patterns 250 increase. For example, as the intervals W2 between two neighboring light shielding patterns 250 increase, more and more portions of the light transmitting region 254 appear.

More specifically, as shown in FIG. 38, the plurality of light shielding patterns 250 have the same width W1 and the intervals W2 between two neighboring light shielding patterns 250 increase in the direction away from the light source 220.

Accordingly, light luminance may be reduced at a region adjacent to the light emission surface 221 of the light source 220 since the interval W2 is narrow. As being away from the light source 220, the intervals W2 increase so that an area occupied by the light transmitting region 254 increases. This makes light luminance uniform at regions adjacent to the light source 220 and away from the light source 220, thus allowing the backlight unit to provide light of uniform luminance.

Figure 39A:
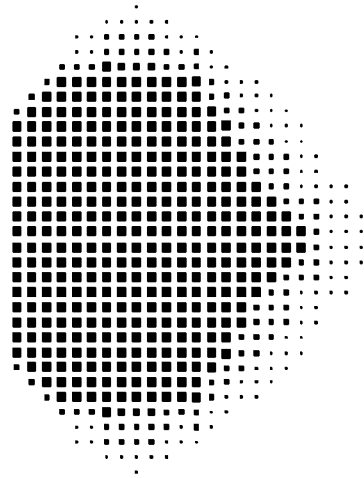
FIGS. 39A to 39C illustrate various arrangements of light shielding patterns having different shapes.
Figure 39B:
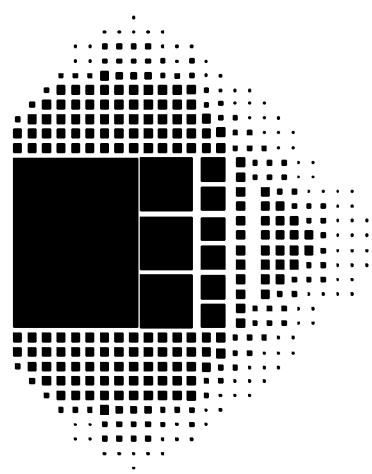
Figure 39C:
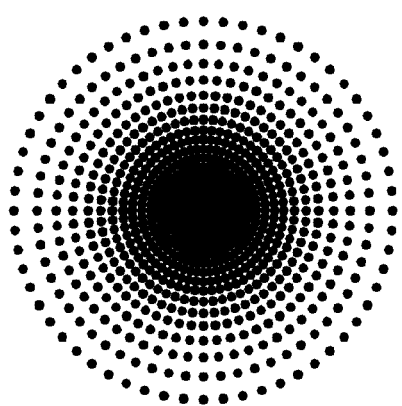

FIGS. 39A to 39C illustrate various arrangements of light shielding patterns having different shapes.

As shown in FIGS. 39A and 39B, a plurality of light shielding patterns 250 have a pentagonal arrangement.

Referring to FIG. 39A, the plurality of light shielding patterns 250 have the same widths and intervals at a region adjacent to the light shielding pattern 250, and the widths and intervals of the light shielding patterns 250 decrease and increase, respectively, as the light shielding patterns 250 are away from the light source 220.

Referring to FIG. 39B, the widths and intervals of the light shielding patterns 250 decrease and increase, respectively, as the light shielding patterns 250 are away from the light source 220.

Referring to FIG. 39C, each light shielding pattern 250 has a circular shape. As the light shielding patterns 250 are away from their center to their outside, the widths remain constant and the intervals increase. However, the embodiments of this document are not limited thereto, and any arrangement or shapes of the light shielding patterns may be adopted as long as more and more portions of the light transmitting region 254 show up as the light shielding patterns are away from the light source 220.

According to an embodiment, the light shielding pattern may have a plurality of holes to adjust the area occupied by the light transmitting region 254.

Figure 40:
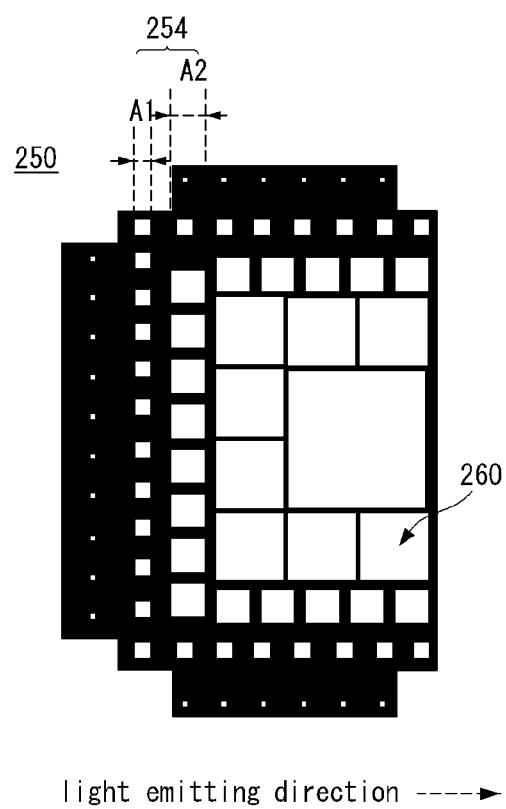
FIGS. 40 to 42 illustrate a backlight unit and a plurality of light shielding patterns according to embodiments of this document.
Figure 41:
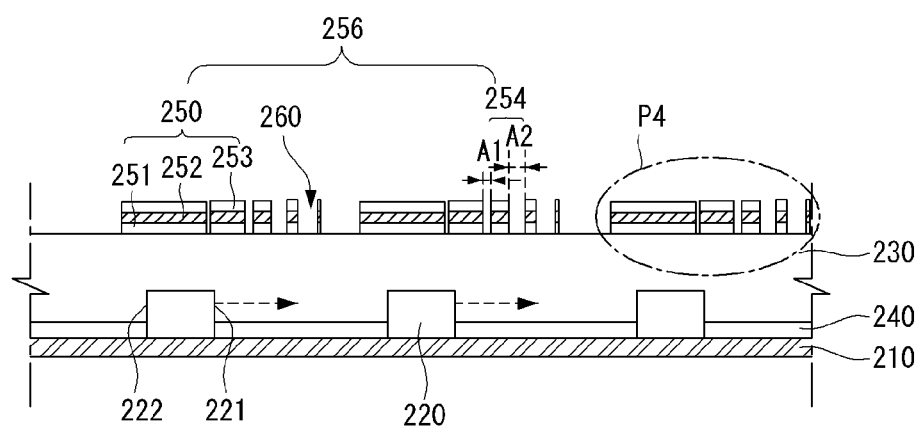
Figure 42:
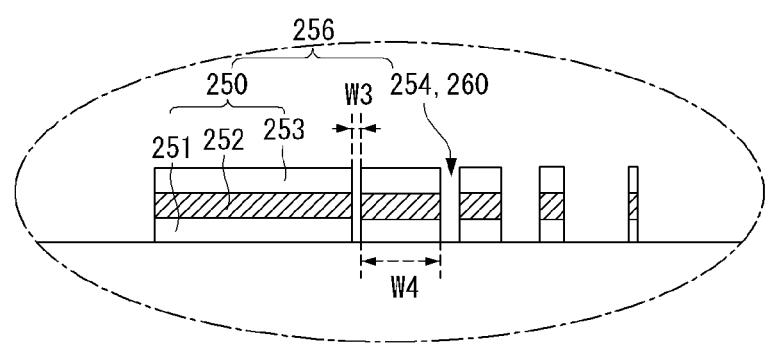

FIGS. 40 to 42 illustrate a backlight unit and a plurality of light shielding patterns according to embodiments of this document.

FIG. 40 is a plan view illustrating light shielding patterns according to an embodiment of this document. FIG. 41 is a view illustrating a backlight unit having light shielding patterns according to an embodiment of this document. FIG. 42 is an expanded view illustrating region P4 of FIG. 41.

Referring to FIGS. 40 and 41, a plurality of light shielding patterns 250 include a plurality of holes 260.

Specifically, referring to FIG. 42, a backlight unit according to an embodiment includes a first layer 210, a plurality of light sources 220 on the first layer 210, a reflection layer 240 on the first layer 210 to surround the plurality of light sources 220, a second layer 230 covering the reflection layer 240 and the light sources 220, and a third layer 256 on the second layer 230. The third layer includes a plurality of light shielding patterns 250 positioned to correspond the respective light sources 220 and a light transmitting region 254 surrounding the plurality of light shielding patterns 250.

As described above, the light transmitting region 254 includes a first region A1 adjacent to the light source 220 and a second region A2 away from the light source 220. The first region A1 is smaller in area than the second region A2. The light transmitting region 254 includes regions between the plurality of light shielding patterns 250. According to an embodiment, as a distance from the light source 220 increases, an area occupied by the light transmitting region 254 may increase or may first increase and may be then maintained as is since a predetermined distance.

Each light shielding pattern 250 includes a first light shielding film 251, a reflection film 252, and a second light shielding film 253 that are sequentially stacked. The light shielding patterns 250 include a plurality of holes 260 through which light is emitted from the light sources 220 to outside. The area occupied by the light transmitting region 254 is adjusted by the number and size of the holes 260.

As the light shielding patterns 250 are away from the light source 220, widths of the holes 260 increase.

More specifically, as shown in FIG. 42, among the holes 260, a hole 260 closest to the light emission surface 221 of the light source 220 has a largest width W3, and as the holes 260 are away from the light source 220, the widths W3 of the holes 260 gradually increase and intervals W4 between two neighboring holes 260 decrease.

Accordingly, as the holes 260 are away from the light source 220, an area occupied by the light transmitting region 254 increases. This makes light bright uniform at regions adjacent to and away from the light source 220, thus allowing the backlight unit to provide light of uniform luminance.

Figure 43:
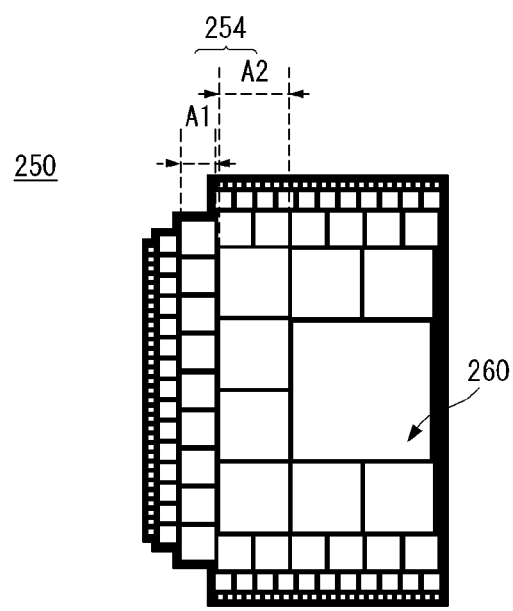
FIGS. 43 to 45 illustrate a backlight unit and a plurality of light shielding patterns according to embodiments of this document.
Figure 44:
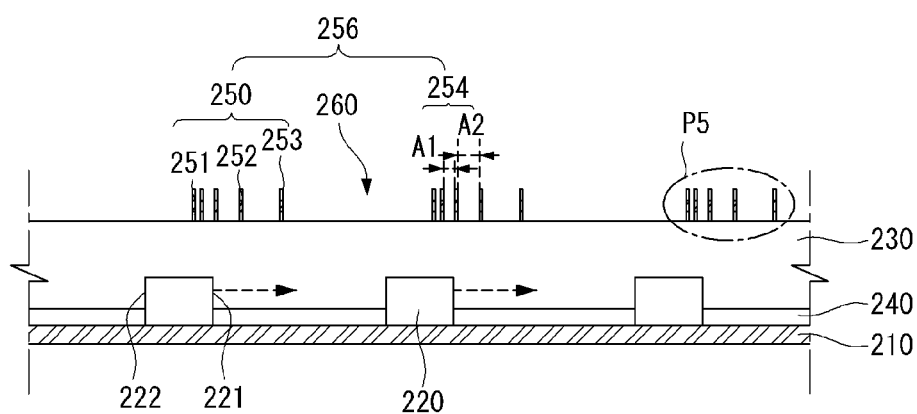
Figure 45:
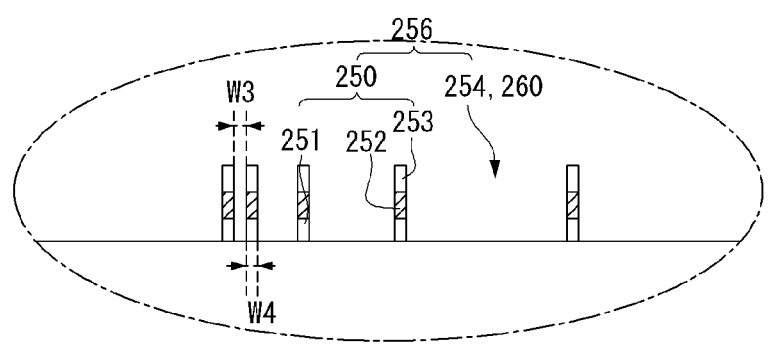

FIGS. 43 to 45 illustrate a backlight unit and a plurality of light shielding patterns according to embodiments of this document.

FIG. 43 is a plan view illustrating light shielding patterns according to an embodiment of this document. FIG. 44 is a view illustrating a backlight unit having light shielding patterns according to an embodiment of this document. FIG. 45 is an expanded view illustrating region P5 of FIG. 44.

Referring to FIGS. 43 and 44, the light transmitting region 254 includes a first region A1 adjacent to the light source 220 and a second region A2 away from the light source 220. The first region A1 is smaller in area than the second region A2. The light transmitting region 254 includes regions between the plurality of light shielding patterns 250. According to an embodiment, as a distance from the light source 220 increases, an area occupied by the light transmitting region 254 may increase or may first increase and may be then maintained as is since a predetermined distance.

Further, the light shielding patterns 250 include a plurality of holes 260. Widths W3 of the holes 260 increase and intervals W4 between two neighboring holes 260 remain constant as the holes 260 are away from the light source 220.

More specifically, as shown in FIG. 45, among the holes 260, a hole 260 closest to the light emission surface 221 of the light source 220 has a largest width W3. As the holes 260 are away from the light source 220, the widths W3 of the holes 260 increase while the intervals W4 are left unchanged.

Since the width W3 and the interval W4 are small near the light emission surface 221 of the light source 220, light luminance may be reduced at the light emission surface 221. As the holes 260 are away from the light source 220, the intervals W4 increase and an area occupied by the light transmitting region 254 resultantly increases. This makes light bright uniform at regions adjacent to and away from the light source 220, thus allowing the backlight unit to provide light of uniform luminance.

Figure 46:
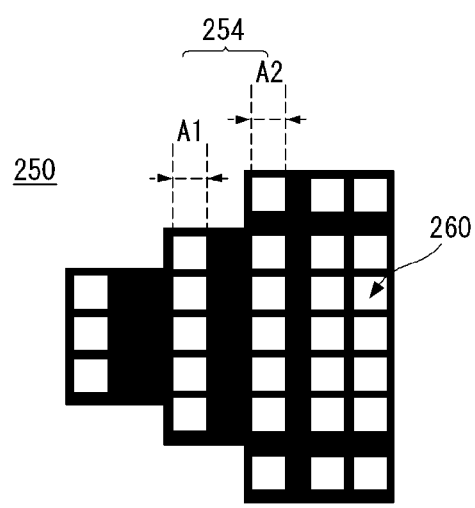
FIGS. 46 to 48 illustrate a backlight unit and a plurality of light shielding patterns according to embodiments of this document.
Figure 47:
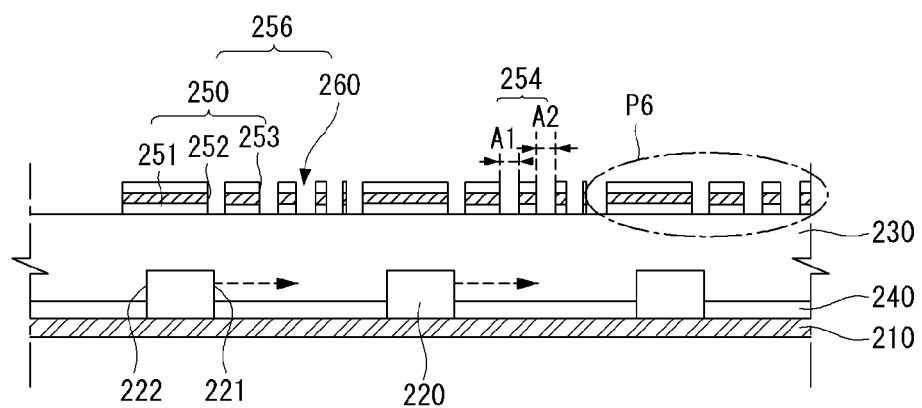
Figure 48:
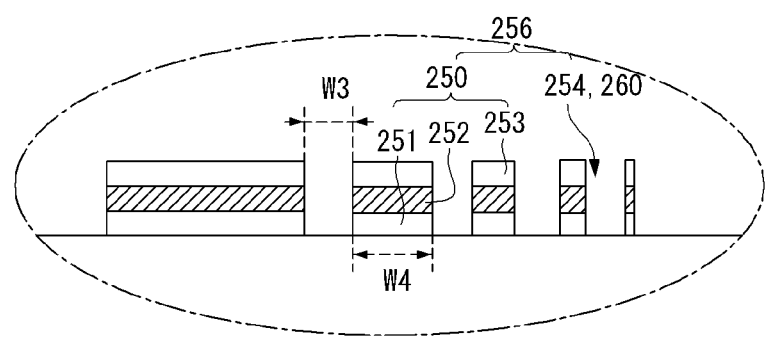

FIGS. 46 to 48 illustrate a backlight unit and a plurality of light shielding patterns according to embodiments of this document.

FIG. 46 is a plan view illustrating light shielding patterns according to an embodiment of this document. FIG. 47 is a view illustrating a backlight unit having light shielding patterns according to an embodiment of this document. FIG. 48 is an expanded view illustrating region P6 of FIG. 47.

Referring to FIGS. 46 and 47, the light transmitting region 254 includes a first region A1 adjacent to the light source 220 and a second region A2 away from the light source 220. The first region A1 is smaller in area than the second region A2. The light transmitting region 254 includes regions between the plurality of light shielding patterns 250. According to an embodiment, as a distance from the light source 220 increases, an area occupied by the light transmitting region 254 may increase or may first increase and may be then maintained as is since a predetermined distance.

Further, the light shielding patterns 250 include a plurality of holes 260. Widths W3 of the holes 260 remain constant and intervals W4 between two neighboring holes 260 decrease as the holes 260 are away from the light source 220.

More specifically, as shown in FIG. 48, as the holes 260 are away from the light source 220, the intervals W4 of the holes 260 decrease while the widths W3 are left unchanged.

Since the interval W4 is large near the light emission surface 221 of the light source 220, light luminance may be reduced at the light emission surface 221. As the holes 260 are away from the light source 220, the intervals W4 decrease and an area occupied by the light transmitting region 254 resultantly increases. This makes light bright uniform at regions adjacent to and away from the light source 220, thus allowing the backlight unit to provide light of uniform luminance.

Figure 49A:
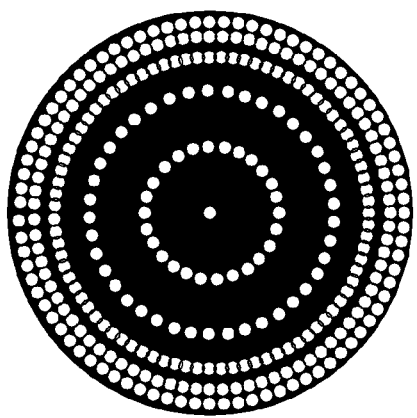
FIGS. 49A and 49B illustrate light shielding patterns having various shapes.
Figure 49B:
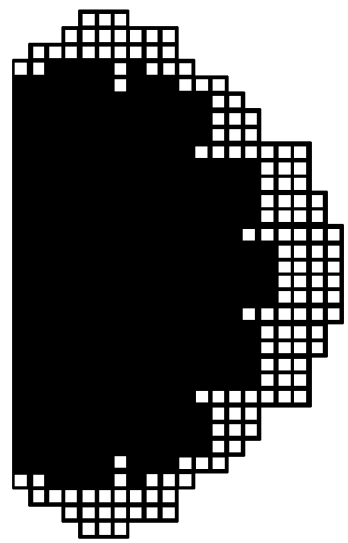

FIGS. 49A and 49B illustrate light shielding patterns having various shapes.

As shown in FIG. 49A, the light shielding pattern 250 has a circular shape and includes a plurality of holes. The plurality of holes constitute a plurality of ring-shaped hole arrays. The ring-shaped hole arrays are loosely arranged at a center of the light shielding pattern 250—for example, a less number of holes are positioned and an interval between two neighboring hole arrays is large near the center of the light shielding pattern 250. In the direction away from the center of the light shielding pattern 250, however, the hole arrays become compact—for example, the number of holes increases and the interval between two neighboring hole arrays decreases. Accordingly, an area occupied by the light transmitting region 254 increases as a distance from the center of the light shielding pattern 250 increases.

As shown in FIG. 49B, the light shielding pattern 250 has a pentagonal shape whose edges are rounded. As a distance increases from a center of the light shielding pattern 250 to outside, the number of holes increases. Accordingly, an area occupied by the light transmitting region 254 increases as a distance from the center of the light shielding pattern 250 increases.

However, the embodiments of this document are not limited thereto, and any arrangement or shapes of the light shielding patterns may be adopted as long as more and more portions of the light transmitting region 254 show up as the light shielding patterns are away from the light source 220.

Although it has been illustrated in FIGS. 30 to 49B that the light shielding pattern has a triple layer structure, the embodiments of this document are not limited thereto. For example, according to an embodiment, the light shielding pattern which has a double layer structure with one or more holes may also be adopted.

According to an embodiment, the third layer 256 may be formed by forming the light shielding patterns 250 and the light transmitting region 254 on a transparent film 270, and may be attached on the second layer 230.

FIGS. 50 to 53 are views illustrating a backlight unit and a method of manufacturing the backlight unit in a sequential order according to an embodiment of this document.

Figure 50:
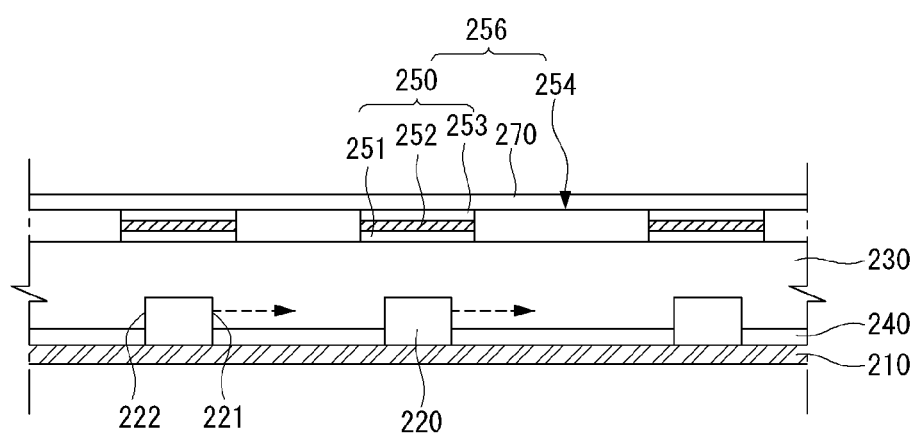
FIGS. 50 to 53 are views illustrating a backlight unit and a method of manufacturing the backlight unit in a sequential order according to an embodiment of this document.

Referring to FIG. 50, a backlight unit according to an embodiment includes a first layer 210, a plurality of light sources 220 on the first layer 210, a reflection layer 240 on the first layer 210 to surround the plurality of light sources 220, and a second layer 230 covering the reflection layer 240 and the light sources 220.

A third layer 256 is formed by forming light shielding patterns 250 and a light transmitting region 254 on a transparent film 270, and is then attached on the second layer 230.

According to an embodiment, the transparent film 270 may be formed of a material similar to the second layer 230, such as, for example, an acrylic-based, urethane-based, epoxy-based, or melamine-based resin, such as, a polymer, a copolymer, or a terpolymer of, for example, unsaturated polyester, methyl methacrylate, ethylmethacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylolacrylamide, glycidyl methacrylate, ethyl acrylate, isobutyl acrylate, normal butyl acrylate, and 2-ethyl hexyl acrylate. However, the embodiments of this document are not limited thereto, and any material having high light transmittance may be used for the transparent film 270.

According to an embodiment, the third layer 256 may be formed by first forming the first light shielding film 251, the reflection film 252, and the second light shielding film 253 on the transparent film 270 and then by attaching the transparent film 270 to the second layer 230 so that the plurality of light sources 220 are aligned with the plurality of respective light shielding patterns 250.

A more specific manufacturing method will now be described with reference to FIG. 51. As shown in (a) of FIG. 51, a first light shielding film material 251a, a reflection film material 252a, and a second light shielding film material 253a are sequentially formed on a transparent film 270. According to an embodiment, the first light shielding film material 251a and the second light shielding film material 253a may be printed with a white ink containing a metal oxide, and the reflection film material 252a may be printed with an ink containing a metal.

Thereafter, a mask layer 275 is formed on the second light shielding film material 253a. According to an embodiment, the mask layer 275 may be formed of a material unreactive with the first light shielding film material 251a, the reflection film material 252a, and the second light shielding film material 253a. For example, according to an embodiment, the mask layer 275 may be formed of an ink including organic and inorganic particles.

Then, some portions of the second light shielding film material 253a are exposed by patterning the mask layer according to predetermined light shielding patterns.

Figure 51:
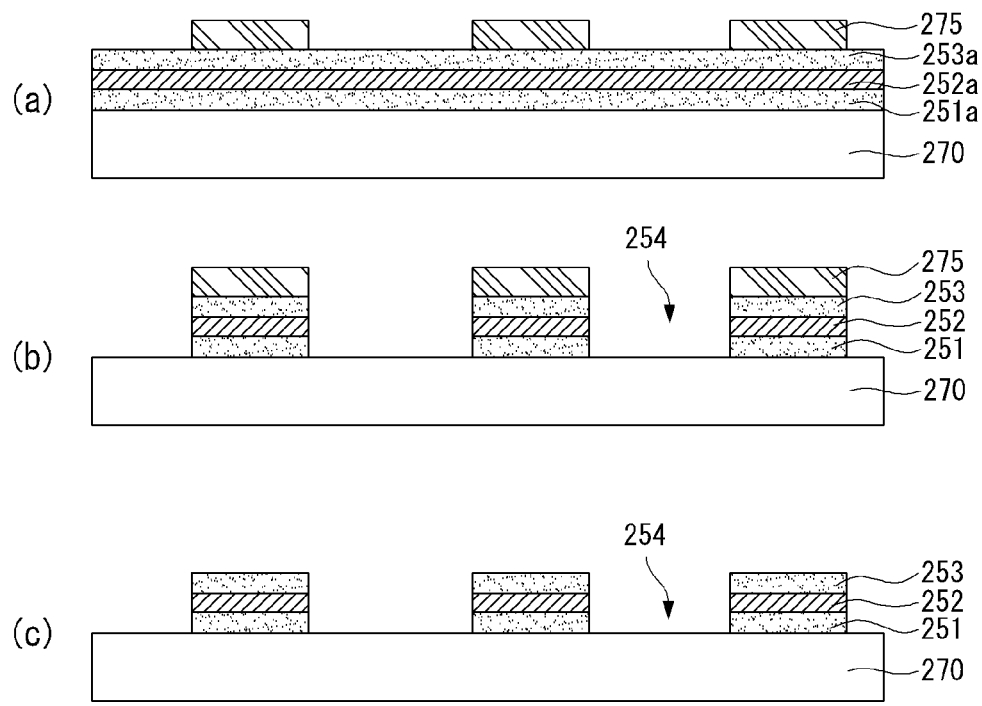

Next, as shown in (b) of FIG. 51, the exposed first light shielding material 251a, the reflection film material 252a, and the second light shielding film material 253a are partially removed using the patterned mask layer 275 as a mask, thus forming light transmitting regions 254. As a consequence, first light shielding films 251, reflection films 252, and second light shielding films 253 are formed.

As shown in (c) of FIG. 51, the remaining mask layer 275 is then removed, thus forming light shielding patterns 250 that includes the first and second light shielding films 251 and 253 on the transparent film 270.

Although a chemical etching process combined with a photoresist process has been used to manufacture the light shielding patterns, the embodiments of this document are not limited thereto. For example, according to an embodiment, the light shielding patterns may also be manufactured using a laser transfer process or physical etching process.

Figure 52:
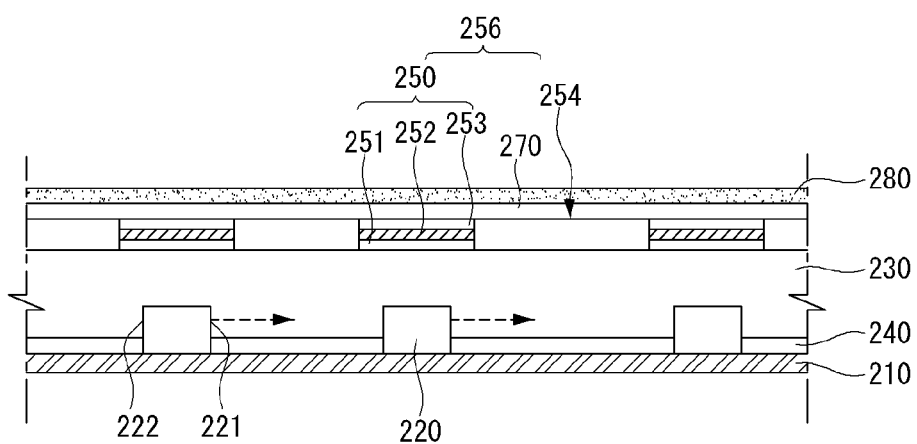

Referring to FIG. 52, a diffusing plate 280 is formed on the backlight unit. The diffusing plate 280 diffuses light emitted from the backlight unit to an outside, thus allowing the backlight unit to provide further uniform light luminance. Although it has been illustrated in FIG. 52 that the diffusing plate 280 is attached to the transparent film 270, the diffusing plate 280 may also be spaced apart from the transparent film 270 according to an embodiment.

Figure 53:
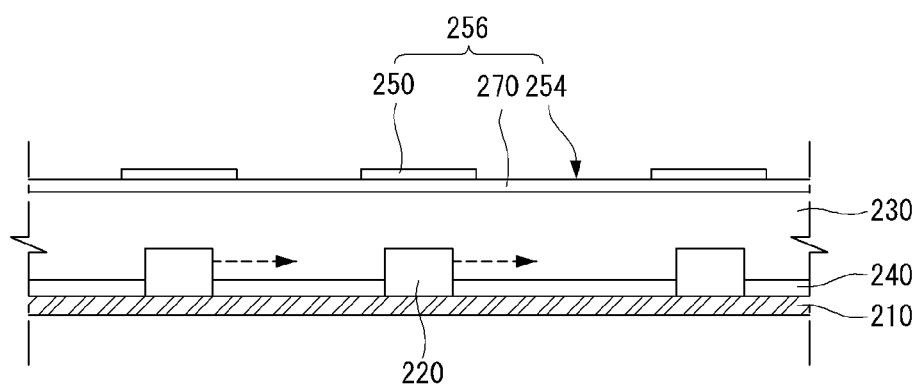

As shown in FIG. 53, the third layer 256 obtained by forming the light shielding patterns 250 and the light transmitting region 254 on the transparent film 270 is attached to the second layer 230. According to an embodiment, the transparent film 270 is positioned on the second layer 230, and the light shielding patterns 250 and the light transmitting region 254 are positioned on the transparent film 270.

The light shielding patterns 250 and the light transmitting region 254 are formed on the transparent film 270, and are then attached onto the second layer 230. Such a structure facilitates its manufacturing processes, thus enhancing productivity.

The embodiments have been described where the transparent film 270 and/or the diffusing plate 280 are formed on the light shielding patterns 250. However, the embodiments of this document are not limited thereto.

FIG. 54 is a view illustrating a backlight unit according to an embodiment of this document.

Referring to FIG. 54, a reflection layer 240 is formed on a first layer 210. The reflection layer 240 includes a plurality of holes through which the respective corresponding light sources 220 are inserted. The light sources 220 are protruded upwards through the respective holes and are surrounded by a second layer 230.

A third layer 256 is formed on the light sources 220. The third layer 256 includes a transparent film 270, light shielding patterns 250 on the transparent film 270, and a light transmitting region 254. The transparent film 270 is brought in tight contact with upper portions of the light sources 220. According to an embodiment, the second layer 230 between the reflection layer 240 and the transparent film 270 may be formed of an air layer.

The backlight unit according to the embodiments is manufactured by attaching the third layer 256 on the light sources 220. Therefore, the backlight unit may be easily manufactured with enhanced productivity. Although it has been described that the light shielding patterns 250 are formed of a single layer, the embodiments of this document are not limited thereto. According to an embodiment, the light shielding patterns 250 may be formed of a dual layer or a triple layer.

Figure 55:
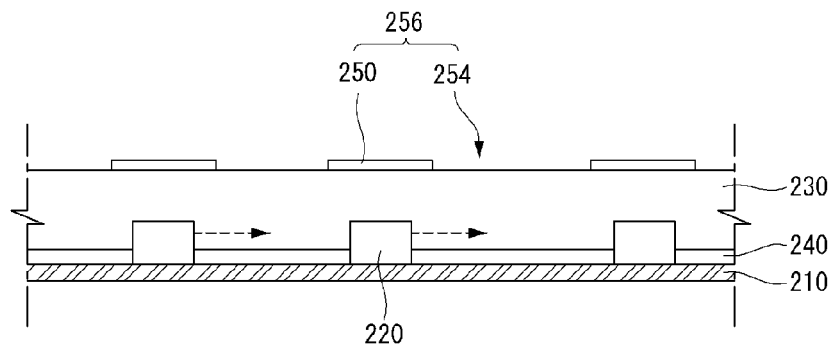
FIG. 55 is a view illustrating a backlight unit according to an embodiment of this document.

FIG. 55 is a view illustrating a backlight unit according to an embodiment of this document.

Referring to FIG. 55, the light shielding patterns 250 are formed of a single layer. Specifically, a plurality of light sources 220 are formed on a first layer 210, a reflection layer 240 is formed on the first layer 210 to reflect light emitted from the plurality of light sources 220, and a second layer 230 is formed to cover the plurality of light sources 220 and the reflection layer 240. Further, a third layer 256 is formed on the second layer 230. The third layer 256 includes a plurality of light shielding patterns 250 and a light transmitting region 254 surrounding the plurality of light shielding patterns 250. The plurality of light shielding patterns 250 are positioned to correspond to the respective light sources 220.

As described above, the light shielding patterns 250 are formed of a single layer. According to an embodiment, the single layer may include one of a light shielding film and a reflection film.

For example, according to an embodiment, the light shielding patterns 250 may serve as a light shielding film that shields at least a part of light emitted from the light sources 220. According to an embodiment, the light shielding patterns 250 may function as a reflection film that reflects at least a part of light emitted from the light sources 220. The light shielding film and the reflection film are the same as the light shielding film and the reflection film described in connection with FIGS. 6 to 54.

By forming the light shielding patterns 250 on the second layer 230, it may be possible to reduce luminance of light coming from regions adjacent to the light sources 220, thus allowing the backlight unit 200 to provide light of uniform luminance.

For example, the light shielding patterns 250 are formed on the second layer 230 to correspond to the respective light sources 220 and selectively shields or reflects light emitted upwards from the light sources 220, thus reducing luminance of light coming from the regions adjacent to the light sources 220. The reflected light may be diffused toward a side surface or a lower side.

According to embodiments, the components of the backlight unit described in connection with FIGS. 6 to 55 may be combined with one another.

Figure 56:
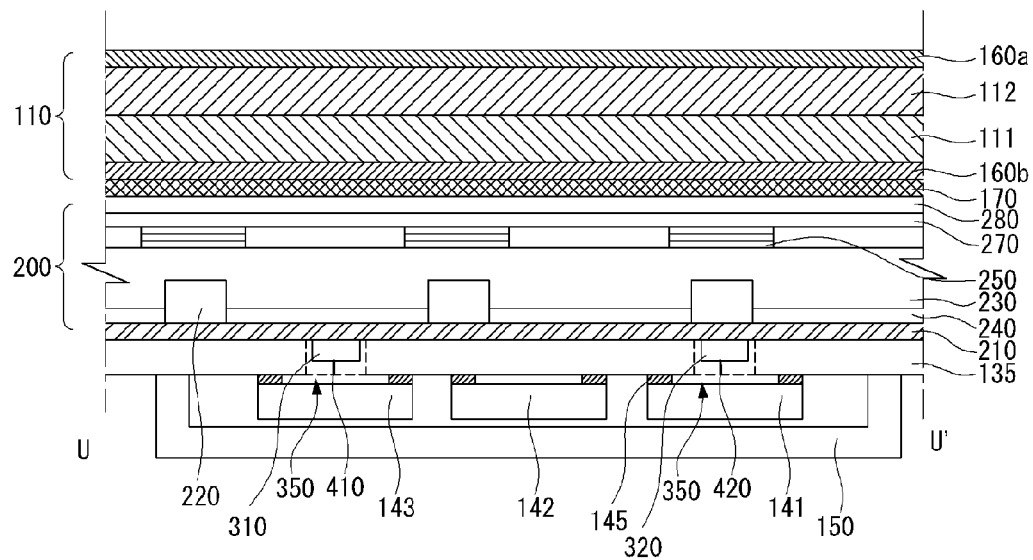
FIG. 56 is a cross sectional view illustrating a display apparatus according to an embodiment of this document.

FIG. 56 is a cross sectional view illustrating a display apparatus according to an embodiment of this document. FIG. 56 is a cross sectional view taken along line U-U' of FIG. 1. The same reference numerals may be used to denote the same or substantially the same elements as those described in connection with FIGS. 1 to 55.

Referring to FIG. 56, a display panel 110 includes a first substrate 111, a second substrate 112, an upper polarizing plate 160a, and a lower polarizing plate 160b. A backlight unit 200 includes a first layer 210, a plurality of light sources 220, and a second layer 230. The display panel 110 is brought in tight contact with the backlight unit 200.

According to an embodiment, an adhesive is applied between the display panel 110 and the backlight unit 200 so that the backlight unit 200 may be attached and fixed to a lower surface of the display panel 110.

Specifically, an upper surface of the backlight unit 200 is attached to a lower surface of the lower polarizing plate 160b by an adhesive 170.

The backlight unit 200 includes a plurality of light sources 220 on the first layer 210, a reflection layer 240 surrounding the plurality of light sources 220, a second layer 230 on the reflection layer 240, and a plurality of light shielding patterns 250 each having a first light shielding film, a reflection film, and a second light shielding film. A transparent film 270 is formed on the light shielding patterns 250, and a diffusing plate 280 is formed on the transparent film 270. However, the embodiments of this document are not limited thereto. For example, the backlight units described in connection with FIGS. 1 to 52 may be adopted.

A bottom plate 135 is arranged under the backlight unit 200 so that the bottom plate 135 is brought in tight contact with a lower surface of the first layer 210.

According to an embodiment, the backlight unit 200 may include a plurality of blocks that may be driven separately from each other.

The display apparatus includes a display module, for example, a driver that supplies driving signals and power to the display panel 110 and the backlight unit 200. For example, the plurality of light sources 220 in the backlight unit 200 generate light using power supplied from the driver.

The driver includes a driving controller 141, a main board 142, and a power supply 143. The driver is arranged and fastened on a driver chassis 145 that is provided on the bottom plate 135, so that the driver may be stably supported and fixed.

A first connector 310 is provided on a rear surface of the first layer 210. The bottom plate 135 includes a hole 350 through which the first connector 310 is inserted.

The first connector 310 electrically connects the light sources 220 to the power supply 143 so that driving voltages may be supplied from the power supply 143 to the light sources 220.

For example, the first connector 310 is formed on a lower surface of the first layer 210 and is connected through a first cable 410 to the power supply 143 so that driving voltages may be supplied from the power supply 143 to the light sources 220 through the first cable 410.

According to an embodiment, an electrode pattern (not shown), such as a carbon nano-tube electrode pattern, may be formed on an upper surface of the first layer 210 and may contact electrodes of the light sources 220 to electrically connect the first connector to the light sources 220.

The driving controller 141, such as, for example, a timing controller, controls driving of the display panel 110 and the backlight unit 200.

The timing controller controls driving timing of the display panel 110. Specifically, the timing controller supply the display panel 110 with signals for controlling driving timing of a data driver (not shown), a gamma voltage generator (not shown), and a gate driver (not shown) provided in the display panel 110.

According to an embodiment, the timing controller may supply the backlight unit 200 with signals for controlling driving timing of the light sources 220 so that the backlight unit 200, more specifically, the light sources 220, are operated in synchronization with the operation of the display panel 110.

As shown in FIG. 56, the driving controller 141 is fastened on the driver chassis 145 to be stably supported and fixed by the driver chassis 145.

A second connector 320 is provided on the first layer 210. The bottom plate 135 includes a hole 350 through which the second connector 320 is inserted.

The second connector 320 electrically connects the first layer 210 to the driving controller 141 so that control signals may be supplied from the driving controller 141 to the first layer 210.

For example, the second connector 320 is formed on a lower surface of the first layer 210 and is connected through a second cable 420 to the driving controller 141 so that control signals may be supplied from the driving controller 141 to the first layer 210 through the second cable 420.

According to an embodiment, a light source driver (not shown) may be provided on the first layer 210 and may drive the light sources 220 using the control signals supplied from the driving controller 141 through the second connector 320.

The power supply 143 and the driving controller 141 are covered by a rear casing 150 to be protected from the outside.

The display apparatus illustrated in FIG. 56 is merely an example. According to embodiments, the arrangement or number of the power supply 143, the driving controller 141, the first and second connectors 310 and 320, and the first and second cables 410 and 420 may vary as necessary.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A backlight unit comprising:
   a first layer;
   a plurality of light sources on the first layer;
   a reflection layer on the first layer, the reflection layer surrounding the plurality of light sources;
   a second layer on the reflection layer and the plurality of light sources; and
   a third layer on the second layer, the third layer comprising a plurality of light shielding patterns arranged to correspond to the light sources, respectively, and a light transmitting region surrounding the plurality of light shielding patterns, wherein the light transmitting region includes first regions adjacent to the light sources and second regions away from the light sources, and wherein the first regions are smaller in area than the second regions.

2. The backlight unit of claim 1, wherein the third film further comprises a transparent film, wherein the plurality of light shielding patterns are arranged on the transparent film.

3. The backlight unit of claim 2, wherein the light shielding patterns are formed of a single layer that includes a light shielding film or a reflection film.

4. The backlight unit of claim 2, wherein the light shielding patterns are formed of a double layer that includes a first light shielding film and a reflection film.

5. The backlight unit of claim 1, wherein the second layer includes a resin layer or an air layer.

6. The backlight unit of claim 2, wherein the light shielding patterns are formed of a triple layer that includes a first light shielding film, a reflection film, and a second light shielding film.

7. The backlight unit of claim 6, wherein the first light shielding film, the reflection film, and the second light shielding film have the same size or different sizes.

8. The backlight unit of claim 6, wherein sizes of the first light shielding film, the second light shielding film, and the reflection film decrease as the first light shielding film, the second light shielding film, and the reflection film are away from the second layer.

9. The backlight unit of claim 1, wherein intervals between two neighboring light shielding patterns of light shielding patterns adjacent to the first regions are smaller than intervals between two neighboring light shielding patterns of light shielding patterns away from the second regions.

10. The backlight unit of claim 1, wherein widths of light shielding patterns adjacent to the first regions are larger than widths of light shielding patterns away from the second regions.

11. The backlight unit of claim 1, wherein intervals between two neighboring light shielding patterns of the plurality of light shielding patterns are of the same.

12. The backlight unit of claim 1, wherein widths of the plurality of light shielding patterns are of the same.

13. A display apparatus comprising:
a backlight unit comprising,
a first layer;
a plurality of light sources on the first layer;
a reflection layer on the first layer, the reflection layer surrounding the plurality of light sources;
a second layer on the reflection layer and the plurality of light sources; and
a third layer on the second layer, the third layer comprising a plurality of light shielding patterns arranged to correspond to the light sources, respectively, and a light transmitting region surrounding the plurality of light shielding patterns, wherein the light transmitting region includes first regions adjacent to the light sources and second regions away from the light sources, and wherein the first regions are smaller in area than the second regions; and
a display panel on the backlight unit.

14. The display apparatus of claim 13, wherein the third film further comprises a transparent film, wherein the plurality of light shielding patterns are arranged on the transparent film.

15. The display apparatus of claim 13, wherein intervals between two neighboring light shielding patterns of light shielding patterns adjacent to the first regions are smaller than intervals between two neighboring light shielding patterns of light shielding patterns away from the second regions.

16. The display apparatus of claim 13, wherein widths of light shielding patterns adjacent to the first regions are larger than widths of light shielding patterns away from the second regions.

17. The display apparatus of claim 13, wherein intervals between two neighboring light shielding patterns of the plurality of light shielding patterns are of the same.

18. The display apparatus of claim 13, wherein widths of the plurality of light shielding patterns are of the same.

* * * * *